US012792012B2

(12) United States Patent
Sloan et al.

(10) Patent No.: US 12,792,012 B2
(45) Date of Patent: Nov. 10, 2026

(54) MULTI-PARAMETER INTERACTION INTERPRETATION TECHNIQUES FOR COMPLEX PREDICTION DOMAIN

(71) Applicant: Optum Services (Ireland) Limited, Dublin (IE)

(72) Inventors: James McNair Sloan, Bathgate (GB); Francesca Romana Cavallo, London (GB); Lee Francis Fedor Stokes, London (GB); Craig Day, Tyne & Wear (GB)

(73) Assignee: OPTUM SERVICES (IRELAND) LIMITED, Dublin (IE)

( * ) Notice: Subject to any disclaimer, the term of this patent is extended or adjusted under 35 U.S.C. 154(b) by 335 days.

(21) Appl. No.: 18/509,048

(22) Filed: Nov. 14, 2023

(65) Prior Publication Data

US 2025/0155870 A1 May 15, 2025

(51) Int. Cl.
*G05B 19/4155* (2006.01)

(52) U.S. Cl.
CPC .................... *G05B 19/4155* (2013.01); *G05B 2219/42033* (2013.01)

(58) Field of Classification Search
None
See application file for complete search history.

(56) References Cited

U.S. PATENT DOCUMENTS 11,694,810 B2 7/2023 Dil Nahlieli
12,597,488 B2 * 4/2026 Schobel ................. G06N 20/20
12,620,036 B2 * 5/2026 Bandopadhyay .... G06Q 40/125
2022/0328147 A1 10/2022 Wright et al.
2023/0001234 A1 * 1/2023 Peri ...................... A61N 5/1031
2024/0290490 A1 * 8/2024 Riveiro Insua ........ G16H 50/30
2024/0387041 A1 * 11/2024 Baldauf-Lenschen ....................... G16H 10/60
2024/0402183 A1 * 12/2024 Xu ....................... C12Q 1/6874
2025/0155870 A1 * 5/2025 Sloan ................. G05B 19/4155
2025/0166077 A1 * 5/2025 Evans .................... G06N 5/045
2025/0241712 A1 * 7/2025 Shannon .............. G06N 3/0464
2026/0148835 A1 * 5/2026 Ganguly ................ G16H 20/70

FOREIGN PATENT DOCUMENTS

BR PI1015255 A2 5/2016

OTHER PUBLICATIONS

Scoring systems for outcome prediction in patients with perforated peptic ulcer (Year: 2013).*
Predictive Score for Posttransplantation Outcomes (Year: 2017).*

* cited by examiner

*Primary Examiner* — Kim T Nguyen
(74) *Attorney, Agent, or Firm* — ALSTON & BIRD LLP

(57) ABSTRACT

Various embodiments of the present disclosure provide parameter interpretation techniques for providing predictive insights for complex parameter combinations within a prediction domain. The techniques may include receiving an input parameter and one or more historical parameters for an entity. The techniques may include identifying, using a partial information decomposition (PID) data source, a plurality of PID scores based on the input parameter and the one or more historical parameters. The techniques may include determining an adverse outcome prediction based on the plurality of PID score and, in response to the adverse outcome prediction, initiating the performance of a prediction-based action.

20 Claims, 7 Drawing Sheets

MULTI-PARAMETER INTERACTION INTERPRETATION TECHNIQUES FOR COMPLEX PREDICTION DOMAIN

BACKGROUND

Various embodiments of the present disclosure address technical challenges related to the interpretation of parameter interactions in complex, multi-parameter prediction domains. Traditional techniques for predicting interactions between a plurality of parameters may rely on manually crafted guidelines that are created by various subject matter experts within a prediction domain. Such guidelines may be limited to the experiences of subject matter experts and fail to comprehensively and accurately account for various combinations of parameters within the prediction domain. At times, the guidelines and/or interaction predictions may be derived from observations through extensive testing exercises that are time consuming and due to timing and processing constraints, necessarily limited to a portion of a plurality parameters within a prediction domain. In some cases, due to the time expense and static nature of such exercises, the observations derived therefrom are out-of-date by the time the exercise is complete. This, in turn, leads to limited observations for only a subset of parameters within a prediction domain that may be inaccurate or fail to account for real-time changes within the prediction domain.

By way of example, in a clinical domain with a plurality of medication and/or diagnosis combinations, traditional methods for identifying possible drug-drug and/or drug-disease combinations are manually performed by medical experts examining medicine guidelines from pharmaceutical manufacturers, such that they may be reviewed and added to best practice medical guidelines. These medical guidelines may be results of many laboratory experiments and clinical trials which take years to test and are limited to a very selective subset of a population and subset of common drug-drug interactions. Due to prohibitive time constraints, it is not traditionally possible to experimentally test all medication-medication interactions, much less all medication-diagnosis interactions.

In some cases, traditional techniques may leverage data mining or apply predictive machine learning methods to identify likely parameter interactions, such as medication-medication interactions. This has been shown to identify known and unknown medication-medication interactions using clinical registries including blood samples. However, such techniques rely on sophisticated features engineering processes potentially derived from sensitive data sources, such as medical and social data points, to train and test a predictive model. The data gathering and feature engineering processes required by such techniques may be time-consuming, challenging, and costly. Moreover, the resulting models lack interpretability, while requiring constant maintenance (e.g., training, hyper-parameter tuning and testing, etc.) over time. In some cases, parameter interactions may be extracted using natural language processing (NLP). However, like predictive modeling techniques, insights derived from natural language processing may be difficult to interpret due to lack of explainability of NLP models.

Various embodiments of the present disclosure make important contributions to traditional parameter interaction interpretation techniques by addressing these technical challenges, among others.

BRIEF SUMMARY

Various embodiments of the present disclosure provide parameter interpretation techniques that improve traditional techniques for interpreting parameter interactions in complex, multi-parameter prediction domains by leveraging sets of partial information decomposition (PID) scores from a PID data source that are tailored to the prediction domain. For instance, some of the techniques of the present disclosure determine predictive insights for an entity and/or an input parameter for the entity based on a plurality of PID scores. The PID scores may be generated at a predetermined frequency using historical datasets that are updated over time to account for changes, such as new parameters, increases or decreases in adverse outcomes, and/or the like. In this manner, some of the techniques of the present disclosure may leverage information theory to generate up-to-date predictions for a prediction domain. When applied to a clinical domain, some of the techniques of the present disclosure enable the initiation of alerts to prescribers and/or other healthcare providers when they are prescribing a medication to a patient with an existing set of medications and/or conditions that is likely to lead to either a medication-medication or medication-diagnosis induced Adverse Drug Event (ADE).

In some embodiments, a computer-implemented method includes receiving, by one or more processors, an input parameter and one or more historical parameters for an entity; identifying, by the one or more processors and using a partial information decomposition (PID) data source, a plurality of PID scores based on the input parameter and the one or more historical parameters; determining, by the one or more processors, an adverse outcome prediction based on the plurality of PID scores; and in response to the adverse outcome prediction, initiating, by the one or more processors, the performance of a prediction-based action.

In some embodiments, a computing system includes memory and one or more processors communicatively coupled to the memory, the one or more processors are configured to receive an input parameter and one or more historical parameters for an entity; identify, using a partial information decomposition (PID) data source, a plurality of PID scores based on the input parameter and the one or more historical parameters; determine an adverse outcome prediction based on the plurality of PID scores; and in response to the adverse outcome prediction, initiate the performance of a prediction-based action.

In some embodiments, one or more non-transitory computer-readable storage media includes instructions that, when executed by one or more processors, cause the one or more processors to receive an input parameter and one or more historical parameters for an entity; identify, using a partial information decomposition (PID) data source, a plurality of PID scores based on the input parameter and the one or more historical parameters; determine an adverse outcome prediction based on the plurality of PID scores; and in response to the adverse outcome prediction, initiate the performance of a prediction-based action.

DETAILED DESCRIPTION

Figure 1:
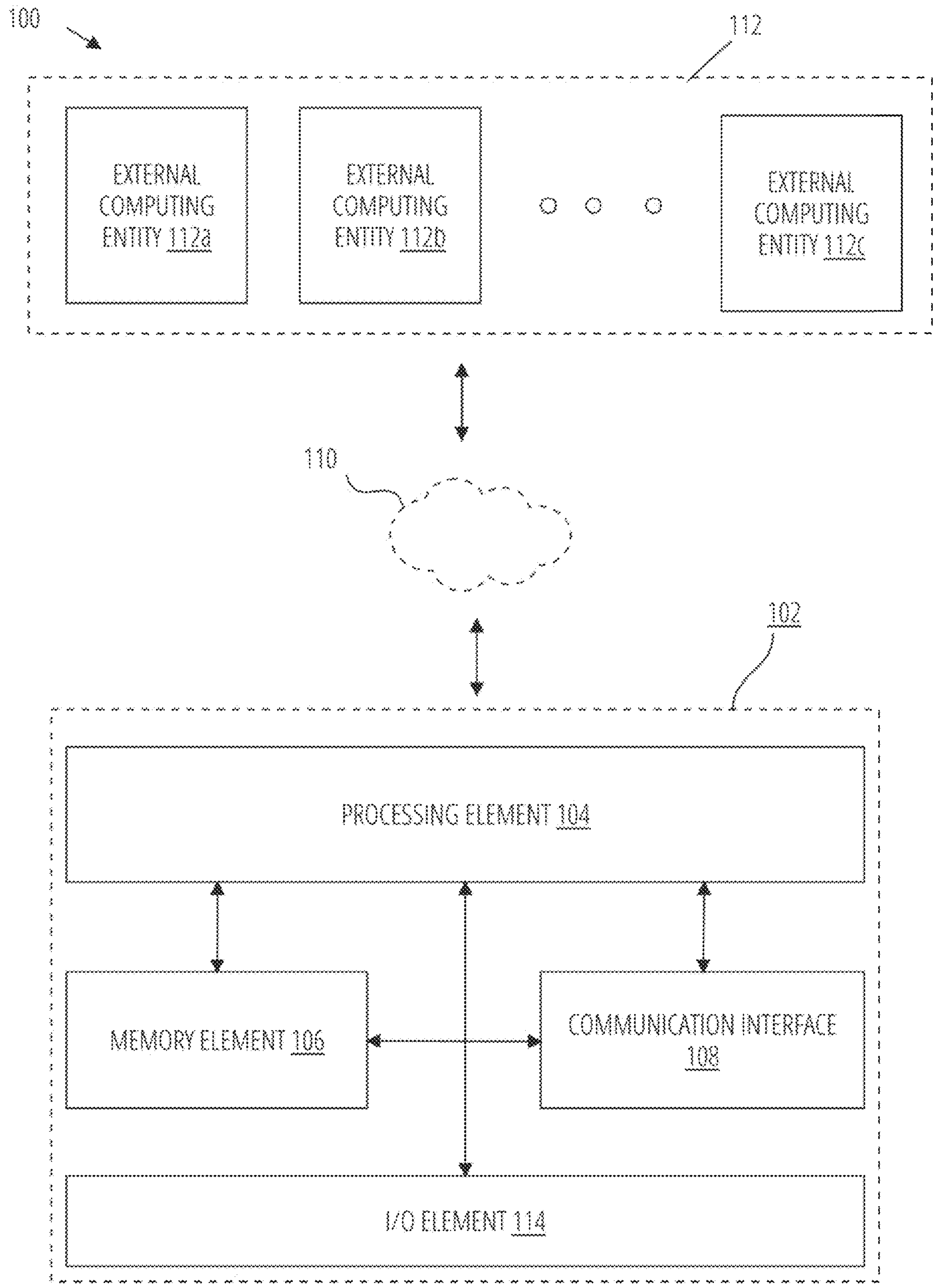
FIG. 1 illustrates an example computing system in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not indicate being based only on or based solely on the referenced element or elements unless so indicated. Like numbers refer to like elements throughout. Moreover, while certain embodiments of the present disclosure are described with reference to predictive data analysis, one of ordinary skills in the art will recognize that the disclosed concepts may be used to perform other types of data analysis.

I. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component May be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like). A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

II. EXAMPLE FRAMEWORK

FIG. 1 illustrates an example computing system 100 in accordance with one or more embodiments of the present disclosure. The computing system 100 may include a predictive computing entity 102 and/or one or more external computing entities 112*a-c* communicatively coupled to the predictive computing entity 102 using one or more wired and/or wireless communication techniques. The predictive computing entity 102 may be specially configured to perform one or more steps/operations of one or more techniques described herein. In some embodiments, the predictive computing entity 102 may include and/or be in association with one or more mobile device(s), desktop computer(s), laptop (s), server(s), cloud computing platform(s), and/or the like. In some example embodiments, the predictive computing entity 102 may be configured to receive and/or transmit one or more datasets, objects, and/or the like from and/or to the external computing entities 112*a-c* to perform one or more steps/operations of one or more techniques (e.g., parameter interpretation techniques, alerting techniques, and/or the like) described herein.

The external computing entities 112*a-c*, for example, may include and/or be associated with one or more entities that may be configured to receive, store, manage, and/or facilitate datasets, such as the historical dataset, source parameter datasets, PID data sources, and/or the like. The external computing entities 112*a-c* may provide such datasets, and/or the like to the predictive computing entity 102 which may leverage the datasets to evaluate an input parameter, as described herein. In some examples, the datasets may include an aggregation of data from across the external computing entities 112*a-c* into one or more aggregated datasets. The external computing entities 112*a-c*, for example, may be associated with one or more data repositories, cloud platforms, compute nodes, organizations, and/or the like, that may be individually and/or collectively leveraged by the predictive computing entity 102 to obtain and aggregate data for a prediction domain.

The predictive computing entity 102 may include, or be in communication with, one or more processing elements 104 (also referred to as processors, processing circuitry, digital circuitry, and/or similar terms used herein interchangeably) that communicate with other elements within the predictive computing entity 102 via a bus, for example. As will be understood, the predictive computing entity 102 may be embodied in a number of different ways. The predictive computing entity 102 may be configured for a particular use or configured to execute instructions stored in volatile or non-volatile media or otherwise accessible to the processing element 104. As such, whether configured by hardware or computer program products, or by a combination thereof, the processing element 104 may be capable of performing steps or operations according to embodiments of the present disclosure when configured accordingly.

In one embodiment, the predictive computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like, may be used to control certain aspects of the operation of the predictive computing entity 102 with the assistance of the processing element 104.

As indicated, in one embodiment, the predictive computing entity 102 may also include one or more communication interfaces 108 for communicating with various computing entities, e.g., external computing entities 112*a-c*, such as by communicating data, content, information, and/or similar terms used herein interchangeably that may be transmitted, received, operated on, processed, displayed, stored, and/or the like.

The computing system 100 may include one or more input/output (I/O) element(s) 114 for communicating with one or more users. An I/O element 114, for example, may include one or more user interfaces for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces from a user of the computing system 100 and provide data to a user through the user interfaces.

Figure 2:
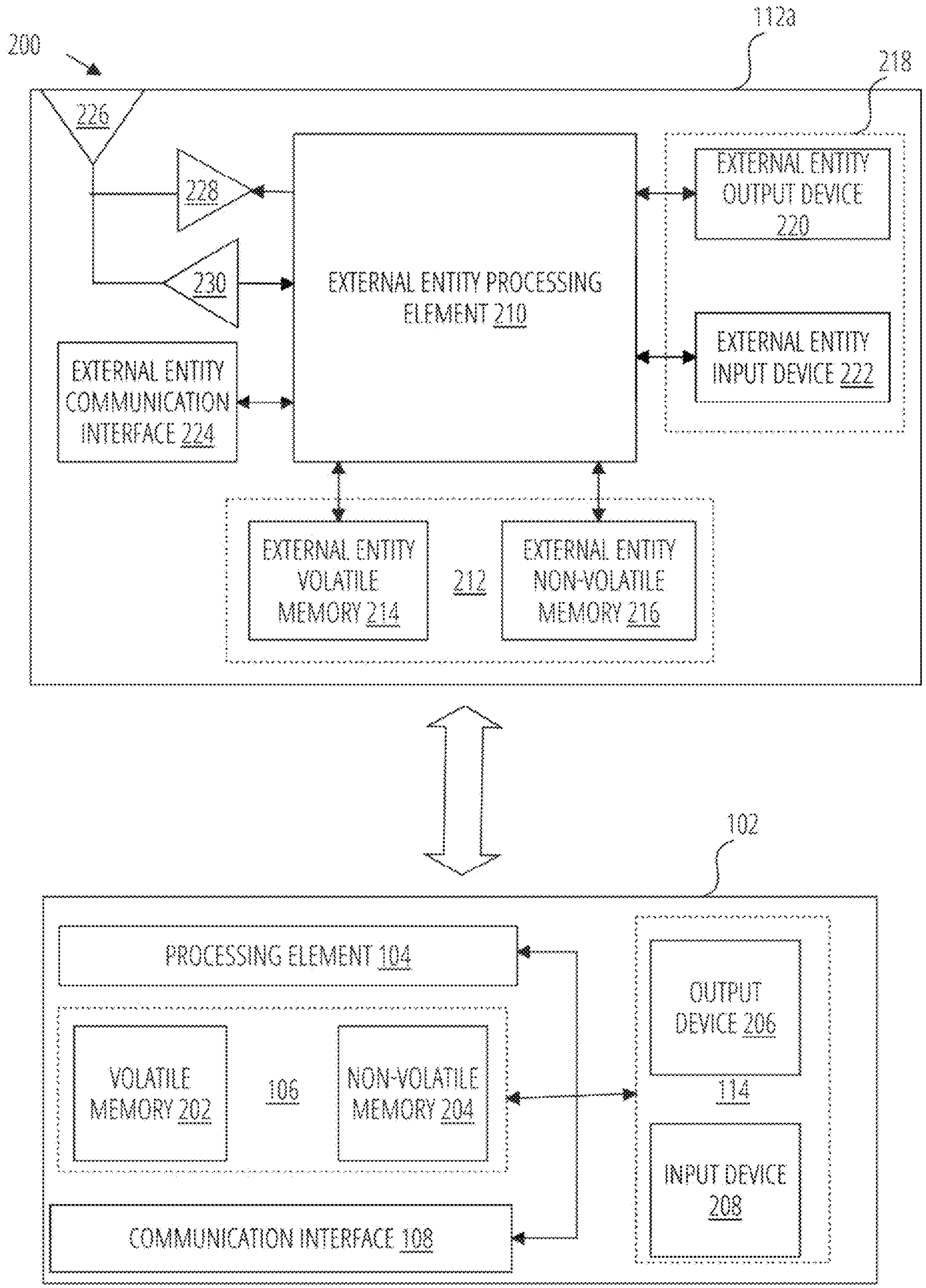
FIG. 2 is a schematic diagram showing a system computing architecture in accordance with one or more embodiments of the present disclosure.

FIG. 2 is a schematic diagram showing a system computing architecture 200 in accordance with some embodiments discussed herein. In some embodiments, the system computing architecture 200 may include the predictive computing entity 102 and/or the external computing entity 112*a* of the computing system 100. The predictive computing entity 102 and/or the external computing entity 112*a* may include a computing apparatus, a computing device, and/or any form of computing entity configured to execute instructions stored on a computer-readable storage medium to perform certain steps or operations.

The predictive computing entity 102 may include a processing element 104, a memory element 106, a communication interface 108, and/or one or more I/O elements 114 that communicate within the predictive computing entity 102 via internal communication circuitry, such as a communication bus and/or the like.

The processing element 104 may be embodied as one or more complex programmable logic devices (CPLDs), microprocessors, multi-core processors, coprocessing entities, application-specific instruction-set processors (ASIPs), microcontrollers, and/or controllers. Further, the processing element 104 may be embodied as one or more other processing devices or circuitry including, for example, a processor, one or more processors, various processing devices, and/or the like. The term circuitry may refer to an entirely hardware embodiment or a combination of hardware and computer program products. Thus, the processing element 104 may be embodied as integrated circuits, application specific integrated circuits (ASICs), field programmable gate arrays (FPGAs), programmable logic arrays (PLAs), hardware accelerators, digital circuitry, and/or the like.

The memory element 106 may include volatile memory 202 and/or non-volatile memory 204. The memory element 106, for example, may include volatile memory 202 (also referred to as volatile storage media, memory storage, memory circuitry, and/or similar terms used herein interchangeably). In one embodiment, a volatile memory 202 may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

The memory element 106 may include non-volatile memory 204 (also referred to as non-volatile storage, memory, memory storage, memory circuitry, and/or similar terms used herein interchangeably). In one embodiment, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In one embodiment, a non-volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile memory 204 may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The memory element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., processing element 104), cause the computer to perform one or more steps/operations of the present disclosure. For instance, the memory element 106 may store instructions that, when executed by the processing element 104, configure the predictive computing entity 102 to perform one or more steps/operations described herein.

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

The predictive computing entity 102 may be embodied by a computer program product which includes non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the volatile memory 202 and/or the non-volatile memory 204.

The predictive computing entity 102 may include one or more I/O elements 114. The I/O elements 114 may include one or more output devices 206 and/or one or more input devices 208 for providing and/or receiving information with a user, respectively. The output devices 206 may include one or more sensory output devices, such as one or more tactile output devices (e.g., vibration devices such as direct current motors, and/or the like), one or more visual output devices (e.g., liquid crystal displays, and/or the like), one or more audio output devices (e.g., speakers, and/or the like), and/or the like. The input devices 208 may include one or more sensory input devices, such as one or more tactile input devices (e.g., touch sensitive displays, push buttons, and/or the like), one or more audio input devices (e.g., microphones, and/or the like), and/or the like.

In addition, or alternatively, the predictive computing entity 102 may communicate, via a communication interface 108, with one or more external computing entities such as the external computing entity 112*a*. The communication interface 108 may be compatible with one or more wired and/or wireless communication protocols.

For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the predictive computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The external computing entity 112*a* may include an external entity processing element 210, an external entity memory element 212, an external entity communication interface 224, and/or one or more external entity I/O elements 218 that communicate within the external computing entity 112*a* via internal communication circuitry, such as a communication bus and/or the like.

The external entity processing element 210 may include one or more processing devices, processors, and/or any other device, circuitry, and/or the like described with reference to the processing element 104. The external entity memory element 212 may include one or more memory devices, media, and/or the like described with reference to the memory element 106. The external entity memory element 212, for example, may include at least one external entity volatile memory 214 and/or external entity non-volatile memory 216. The external entity communication interface 224 may include one or more wired and/or wireless communication interfaces as described with reference to communication interface 108.

In some embodiments, the external entity communication interface 224 may be supported by one or more radio circuitry. For instance, the external computing entity 112*a* may include an antenna 226, a transmitter 228 (e.g., radio), and/or a receiver 230 (e.g., radio).

Signals provided to and received from the transmitter 228 and the receiver 230, correspondingly, may include signaling information/data in accordance with air interface standards of applicable wireless systems. In this regard, the external computing entity 112*a* may be capable of operating with one or more air interface standards, communication protocols, modulation types, and access types. More particularly, the external computing entity 112*a* may operate in accordance with any of a number of wireless communication standards and protocols, such as those described above with regard to the predictive computing entity 102.

Via these communication standards and protocols, the external computing entity 112*a* may communicate with various other entities using means such as Unstructured Supplementary Service Data (USSD), Short Message Service (SMS), Multimedia Messaging Service (MMS), Dual- Tone Multi-Frequency Signaling (DTMF), and/or Subscriber Identity Module Dialer (SIM dialer). The external computing entity 112*a* may also download changes, add-ons, and updates, for instance, to its firmware, software (e.g., including executable instructions, applications, program modules), operating system, and/or the like.

According to one embodiment, the external computing entity 112*a* may include location determining embodiments, devices, modules, functionalities, and/or the like. For example, the external computing entity 112*a* may include outdoor positioning embodiments, such as a location module adapted to acquire, for example, latitude, longitude, altitude, geocode, course, direction, heading, speed, universal time (UTC), date, and/or various other information/data. In one embodiment, the location module may acquire data, such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the DecimalDegrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating a position of the external computing entity 112*a* in connection with a variety of other systems, including cellular towers, Wi-Fi access points, and/or the like. Similarly, the external computing entity 112*a* may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something within inches or centimeters.

The external entity I/O elements 218 may include one or more external entity output devices 220 and/or one or more external entity input devices 222 that may include one or more sensory devices described herein with reference to the I/O elements 114. In some embodiments, the external entity I/O element 218 may include a user interface (e.g., a display, speaker, and/or the like) and/or a user input interface (e.g., keypad, touch screen, microphone, and/or the like) that may be coupled to the external entity processing element 210.

For example, the user interface may be a user application, browser, and/or similar words used herein interchangeably executing on and/or accessible via the external computing entity 112*a* to interact with and/or cause the display, announcement, and/or the like of information/data to a user. The user input interface may include any of a number of input devices or interfaces allowing the external computing entity 112*a* to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the external computing entity 112*a* and may include a full set of alphabetic keys or set of keys that may be activated to provide a full set of alphanumeric keys. In addition to providing input, the user input interface may be used, for example, to activate or deactivate certain functions, such as screen savers, sleep modes, and/or the like.

III. EXAMPLES OF CERTAIN TERMS

In some embodiments, the term "input parameter" refers to a data entity that describes a new, recommended, and/or considered attribute for an entity. An input parameter, for example, may include an additional parameter for consideration with respect to an entity. The additional parameter, for example, may be input to a user interface for consideration with respect to an entity data object representing one or more historical parameters for the entity. The input parameter may include any type of parameter depending on the prediction domain, including clinical parameters (e.g., medications, diagnoses, demographics, such as gender, age, and/or the like, etc.) for a clinical domain, chemical parameters (e.g., chemical sequences, etc.), and/or the like. As an example, in a clinical domain, an input parameter may include a medication prescription for a patient. For instance, a healthcare provider may input a medication prescription as an input parameter identifying one or more new medications for an entity to a user interface. Using some of the techniques of the present disclosure, a user interface may analyze the input parameter and initiate one or more prediction-based actions based on the input parameter.

In some embodiments, the term "entity data object" refers to a data entity that describes an entity within a prediction domain. An entity may be any person, animal, object, and/or the like that is associated with a particular prediction domain. For instance, an entity may depend on the particular prediction domain. As some examples, an entity may include a patient in a clinical domain, a borrower in a financial domain, an animal in a veterinarian domain, and/or the like. As one example, in a clinical domain, an entity may be a patient and/or a member of a healthcare plan.

An entity data object may include a plurality of parameters for an entity. For example, the plurality of parameters may include one or more current and/or historical attributes for an entity. An entity data object, for example, may be indicative (e.g., include one or more entity identifier, etc.) of an entity that is associated with one or more historical parameters. By way of example, an entity data object may include a profile for an entity that includes a plurality of contextual attributes and/or interaction attributes for the entity. The contextual attributes, for example, may include one or more demographic attributes, and/or the like. The interaction attributes may include one or more historical interactions for the entity. The historical interactions, for example, may correspond to one or more historical parameters for the entity.

In some embodiments, the term "historical parameter" refers to a data entity that describes a historical attribute for an entity. A historical parameter, for example, may include a parameter that is previously assigned to an entity as reflected by an entity data object. A historical parameter may include any type of parameter depending on the prediction domain, including clinical parameters (e.g., medications, diagnoses, etc.) for a clinical domain, chemical parameters (e.g., chemical sequences, etc.) for a financial domain, and/or the like. As an example, in a clinical domain, a historical parameter may include a medication prescription and/or a diagnosis for a patient. For example, an entity data object may include a patient record with a plurality of existing and/or previously prescribed (e.g., within a threshold time range, etc.) medications, conditions, and/or the like for a patient.

In some embodiments, one or more historical parameters are considered in combination with an input parameter to determine one or more risk scores for an entity. In a clinical domain, for example, the one or more risk scores may include a risk of an ADE for a combination between historical parameters, such as existing medications and/or conditions/diseases and an input parameter, such as a new medication being prescribed. In some examples, the risk scores may be based on PID scores from a PID data source. In some embodiments, the term "PID data source" refers to a data entity that describes a plurality of precomputed PID scores for a prediction domain. A PID data source, for example, may include a data structure for maintaining and/or providing access to a plurality of precomputed PID scores for a prediction domain. For instance, a PID data source may include one or more database(s), for example local database(s), cloud database(s), and/or any combination thereof. In some examples, a PID data source may include a repository of PID scores with one or more access levels. In addition, or alternatively, the PID data source may be configured to distribute one or more portions of the plurality of PID scores based on one or more access levels. The access levels, for example, may specify a subset of PID scores that are associated with one or more characteristics, such a determination time within a time interval, a number of source and/or target parameters, a target parameter definition, and/or the like.

In some embodiments, the term "PID score" refers to a data entity that describes one or more measures of contribution between a source parameter and a target parameter. For example, a PID score may include a PID value. A PID, for example, may include an extension of a mutual information measure in which a parameter interaction, I(X, Y), between two source parameters, X and Y, describes an amount of information, measured in bits, knowing one source parameter tells you about another source parameter. A PID score describes one or more contribution measurements of multiple source parameters, X and Y, with respect to a target parameter, Z. By way of example, a PID score with source parameters, X and Y, with respect to target parameter, Z, may be represented as: PID I(Z: X, Y). The PID score may be broken down into multiple information components:

$$PID\ I(Z{:}X,Y)=U(Z{:}X\backslash Y)+U(Z{:}Y\backslash X)+R(Z{:}X,Y)+S(Z{:}X,Y)$$

In some embodiments, the multiple source information components of a PID score include one or more source contribution scores, redundancy scores, and/or aggregate contribution score. For instance, source contribution scores, denoted as U (Z: X\Y) and U (Z: Y\X), may be descriptive of a measure of contribution between a first source parameter and the target parameter in the absence of a known value for a second source parameter. A redundancy score, denoted as R (Z: X, Y), may be descriptive of redundant information shared by the first and second source parameters with respect to the target parameter. An aggregate contribution score, denoted as S (Z: X, Y), is descriptive of synergy information shared by the source parameters with respect to the target parameter.

A PID score may be generated for discrete and/or continuous source parameters. In addition, or alternatively, PID scores may be measured for any number of source parameters (X1, X2, . . . . Xn) and a target parameter Z such that unique and synergistic information May be calculated in a single calculation instead of computing PID for each combinatorial pairing of the source parameters.

In some examples, a PID score may include a point wise PID score. A point wise PID score may include a plurality of values (e.g., source contribution scores, redundancy scores, aggregate contribution scores, etc.) for a second source parameter with respect to a target parameter, a fixed first source parameter, and/or one or more values of the second source parameter. By way of example, a plurality of contributions with respect to a binary first parameter, X (e.g., an anti-inflammatory 50 mg capsule in a clinical domain, etc.), a continuous random parameter, Y (e.g., one or more dosages of Steroids in the clinical domain example, etc.), and a binary target parameter, Z (e.g., an adverse drug event, etc. in a clinical domain, etc.) may be modelled as a plurality of point wise PID scores in which one or more source contribution scores, redundancy scores, aggregate contribution scores, and/or the like may be measures for one or more different values (e.g., dosages, etc.) of a continuous parameter.

In some embodiments, a PID data source includes a plurality of precomputed PID scores for a particular prediction domain. The plurality of precomputed PID scores may include a predetermined score for each of a plurality of source parameters and/or target parameters for a prediction domain. While two source parameters are used for exemplary purposes, the PID scores may extend to any number of source parameters including combinations of three, four, ten, and/or the like, source parameters (e.g., medications, diagnoses, etc. in a clinical domain). In some examples, the PID scores, and/or one or more components thereof (e.g., source contribution scores, redundancy scores, aggregate contribution scores, etc.) may be determined offline and retrieved in real time to access a risk of one or more combinations of medications, diagnoses, and/or the like.

By way of example, in a clinical domain, a plurality of precomputed PID scores may be generated for each of a plurality of possible medication-medication and/or medication-diagnosis interactions within the clinical domain. The source parameters, for example, may be defined as whether an entity (e.g., a patient, etc.) has been prescribed medication A (e.g., source parameter X) and/or medication B (e.g., source parameter Y). A target parameter may be defined as whether the entity suffered an adverse outcome (e.g., an ADE, etc.) over some future time period after the point of prescription. In this manner, using some of the techniques of the present disclosure, a plurality of PID scores (and/or components thereof) may be generated for a plurality of medication and diagnosis combinations where source parameters may include a medication that may be prescribed (e.g., an input parameter, etc.) and/or an entity's existing medications and/or conditions (e.g., historical parameters, etc.) and a target parameter may be whether the entity may suffer an adverse event (e.g., adverse drug event, etc.). This allows for the calculation of source contribution scores, redundancy scores, aggregate contribution scores, and/or the like for a medication being prescribed with an entity's existing set of medications and/or conditions. By precomputing such values, some of the techniques of the present disclosure enable the real time comparison of various information components between the new medications and existing entity medications and/or conditions to flag higher risk prescriptions.

In some embodiments, the term "source parameter" refers to a data entity that describes a random variable (e.g., X or Y) of a PID score. A source parameter, for example, may include a parameter that is previously identified for a prediction domain. In some examples, a source parameter may have a potential causal impact on a target parameter within the prediction domain. A source parameter may include any type of parameter depending on the prediction domain, including clinical parameters (e.g., medications, diagnoses, etc.) for a clinical domain, chemical parameters (e.g., chemical sequences, etc.), and/or the like. As an example, in a clinical domain, a source parameter may include a medication prescription and/or a diagnosis for a patient. In some examples, a plurality of source parameters for a prediction domain may be identified by a source parameter dataset.

In some embodiments, the term "source parameter dataset" refers to a dataset for a prediction domain. For example, a source parameter dataset may include a comprehensive dataset that aggregates data from one or more disparate data sources associated with a prediction domain. The source parameter dataset may include a plurality of source parameters aggregated from the one or more disparate data sources. The one or more data sources, for example, may be based on the prediction domain and/or source parameters. By way of example, in a clinical domain, a source parameter dataset may include one or more medication codes, such as NDC codes, aggregated from a plurality of medication providers, manufacturers, and/or regulation agency. As another example, in a clinical domain, a source parameter dataset may include one or more assessment codes, such as international classification of diseases (ICD) codes, aggregated from a plurality of coding agencies, and/or the like. In some examples, a source parameter dataset may aggregate the plurality of source parameters from a historical dataset.

In some embodiments, the term "target parameter" refers to a data entity that describes a target variable (e.g., Z) of a PID score. A target parameter, for example, may include a parameter of interest for a prediction domain. In some examples, a target parameter may be impacted by one or more source parameters, individually and/or in one or more combinations. A target parameter may include any type of parameter of interest for any prediction domain, including clinical parameters of interest (e.g., adverse medical event, etc.) for a clinical domain, chemical parameters of interest (e.g., adverse chemical interactions, etc.), and/or the like. As an example, in a clinical domain, a target parameter may include an ADE.

In some embodiments, a target parameter is defined by a target parameter definition. A target parameter definition may define one or more constraints on a target parameter, such as an ADE in a clinical domain. By way of example, a target parameter definition may include one or more timing constraints, severity constraints, and/or the like for defined a particular type of target parameter (e.g., ADE, etc.).

In some examples, one or more target parameter definitions for a target parameter may define a scale for different levels of a target parameter. For instance, the target parameter definitions may define a ranking scale of a level of various adverse outcomes within a prediction domain. By way of example, in a clinical domain, a target parameter definition may include one or more different time periods (e.g., from a prescription of a medication, etc.), one or more different severity levels (e.g., symptoms, conditions, etc.), and/or the like for an ADE to allow clinicians to anticipate and take predictive mitigation actions based on a severity level of a potential ADE. In addition, or alternatively, the target parameter definitions may enable user to prioritize potential risks based their ultimate severity levels.

In some examples, a plurality of PID score may be generated for each of a plurality of different target parameters as defined by different variations of target parameter definitions. By way of example, a target variable, such as a possible ADE may be treated as a continuous and/or ordinal value. For example, if a hospital and/or healthcare system has an ADE scoring system where an ADE is scored by clinicians on a scale of 1-10, where 0=No ADE, . . . , 10=death from ADE, a different PID score (and/or component thereof) may be generated for each level of the ADE.

In some embodiments, the term "historical dataset" refers to a dataset for a prediction domain. For example, a historical dataset may include a comprehensive dataset that aggregates data from one or more disparate data sources associated with a prediction domain. A historical dataset may include a plurality of historical data objects. The historical data objects, for example, may record one or more historical events within the prediction domain. A historical dataset (e.g., the historical data object thereof) may be tailored to a prediction domain. For example, in a clinical domain, a historical dataset may include claims data descriptive of a plurality of medical claims issued by one or more healthcare providers associated with the prediction domain. In some examples, a historical dataset may include a plurality of historical data objects that are issued, recorded, and/or otherwise associated with a time interval.

In some embodiments, the term "time interval" refers to a unit of time. In some examples, a time interval may include a frequency for updating a historical dataset, updating one or more PID scores generated based on the historical dataset, and/or the like. For example, a time interval may include a time range (e.g., one or more weeks, months, years, etc.) within which a plurality of historical data objects may be considered for generating a plurality of PID scores. In addition, or alternatively, a time interval may include a timing frequency (e.g., one or more weeks, months, years, etc.) at which a plurality of PID scores may be generated based on the plurality of historical data objects of the historical dataset.

In some embodiments, the term "historical data object" refers to a data entity of a historical dataset. Each historical data object may reference one or more source parameters and/or target parameters corresponding to a historical event within a prediction domain. For example, a historical data object may include a recorded event of a target parameter and/or one or more source parameters for an entity. By way of example, in a clinical domain, historical data object may include a medical claim in which a medication is prescribed and/or a diagnosis is recorded for an entity. In addition, or alternatively, the medical claim may record an occurrence of an ADE for the entity.

In some embodiments, the term "input parameter contribution score" refers to a predicted measure of impact that an input parameter may have on a target parameter. For instance, an input parameter contribution score may include a source contribution score that corresponds to an input parameter. The input parameter contribution score, for example, may measure the input parameter's individual impact on a target parameter. In a clinical domain, the input parameter contribution score may be indicative (e.g., include bit values identifying, etc.) of a potentially prescribed medication's individual impact on a target parameter, such as an ADE for an entity.

In some embodiments, the term "historical parameter contribution score" refers to a predicted measure of impact that a historical parameter may have on a target parameter. For instance, a historical parameter contribution score may include a source contribution score that corresponds to a historical parameter. The historical parameter contribution score, for example, may measure the historical parameter's individual impact on a target parameter. In a clinical domain, the historical parameter contribution score may be indicative (e.g., include bit values identifying, etc.) of a previously prescribed medication and/or diagnosis's individual impact on a target parameter, such as an ADE for an entity.

In some embodiments, the term "aggregate contribution score" refers to a predicted measure of impact that a combination of input and historical parameters may have on a target parameter. For instance, an aggregate contribution score may include an aggregate contribution score that corresponds to a combination of input and historical parameters for an entity. The aggregate contribution score, for example, may measure the synergistic impact of a combination of input and historical parameters on a target parameter. In a clinical domain, an aggregate contribution score may be indicative (e.g., include bit values identifying, etc.) of a synergistic impact of a combination of a new mediation with one or more recorded medications and/or diagnoses on a target parameter, such as an ADE for an entity.

In some embodiments, the term "synergy ratio" refers to a relative measure of impact of an input parameter on a target parameter. For example, a synergy ratio may be based on a comparison between an input contribution score and an aggregate contribution score. By way of example, a synergy ratio may include a ratio of an aggregate contribution score relative to an input contribution score.

In some examples, combinations of source parameters that have high synergy information (e.g., aggregate contribution scores, etc.) relative to each source parameter's contribution score may be highly likely to be a combination that leads to a target parameter. A synergy ratio may be determined between an aggregate contribution score, denoted as I(ADE: A, B), and between two or more source parameters and each of the source contributions, denoted I(ADE: A\B) and I(ADE: B\A), respectively. If one or both synergy ratios are above a threshold risk score, then the combination may be flagged as a potential pairing that is highly likely to lead to a target parameter. In some examples, one or more additional rules may be applied to compare the synergy information (e.g., aggregate contribution score, etc.) with source contributions and/or redundant contribution.

In some embodiments, the term "threshold risk score" refers to a data entity that describes criteria for an adverse outcome prediction derived from one or more PID score-based insights. A threshold risk score, for example, may include a threshold synergy ratio. In some examples, an input parameter may be flagged in the event that the input parameter's synergy ratio achieves and/or exceeds the threshold risk score. For example, a prediction-based action may be initiated (e.g., by throwing an alert, etc.) based on one or more PID scores for a combination of source parameters, such as an input parameter and/or one or more historical parameters. In some examples, the prediction-based action may be initiated in response to an input parameter's synergy ratio exceeding the threshold risk score.

By way of example, in a clinical domain, anti-inflammatoires and steroids are well-known drug-drug interactions that increase the probability of an entity suffering an ADE, specifically a gastrointestinal bleed. Using PID scores, such as the synergy ratio and the source contribution scores for the anti-inflammatoires and/or steroids, a determination may be made that the synergy ratio is larger than either of the source contributions for the anti-inflammatories and/or steroids. The synergy ratios between the aggregate contribution score and each of the source contribution scores may thereby exceed the threshold risk score.

In some embodiments, the term "adverse outcome prediction" refers to a predictive output that represents target parameter's likelihood of occurrence. An adverse outcome prediction, for example, may include a real number, percentage, probability, and/or the like that describes a probability of a target parameter, such as an ADE in a clinical domain. In some examples, an adverse outcome prediction may be based on one or more synergy ratios for an input parameter and/or one or more historical parameters for an entity. In some examples, an adverse outcome prediction may be based on a threshold risk score. By way of example, an adverse outcome prediction may identify whether one or more of the synergy ratios achieve and/or exceed the threshold risk score.

An adverse outcome prediction, for example, may be indicative (e.g., include a prediction identifier, etc.) of a likelihood of an occurrence of a target parameter based on synergy ratios corresponding to one or more input and/or historical parameters for an entity. As described herein, a target parameter may be based on a prediction domain. For example, in a clinical domain, a target parameter may include an occurrence of an ADE that may be defined as an unwanted negative health outcome associated with taking a medication or several medications. A harmful medication-medication interaction may occur when taking medications, A or B, separately is low-risk but taking both medications simultaneously is highly likely to lead to an ADE. Similarly, a medication-diagnosis interaction may occur when taking a medication whilst suffering from a specific diagnosis is highly likely to lead to an ADE. An adverse outcome prediction may be indicative (e.g., include a prediction identifier, etc.) of a relative likelihood of an occurrence of an ADE with respect to a combination of medications and/or diagnoses.

In some embodiments, the term "prediction-based action" refers to a computing action initiated, triggered, and/or caused by an adverse outcome prediction. By way of example, a prediction-based action may include an initiation of an alert. For instance, an alert may be thrown in the event of a high risk of an occurrence of a target parameter (e.g., ADE, etc.) from the addition of an input parameter (e.g., given a synergy ratio, etc.) for an entity. In a clinical domain, being able to generate alerts if an entity is on multiple medications is important, especially for older demographics where ADEs are common as they are taking on average more medications than the general population.

In some embodiments, the term "alternative parameter" refers to a data entity that describes a replacement for an input parameter. For example, an alternative parameter may include related parameter for replacing an input parameter with a safer alternative based on one or more PID scores respectively corresponding to the input and alternative parameters. By way of example, a prediction-based action may include generating an alternative parameter in response to an adverse prediction outcome. To do so, a source parameter dataset may be accessed to identify a plurality of related parameters (e.g., medications for a clinical domain, etc.) for an input parameter. The related parameters, for example, may include a plurality of related medications for treating a condition for which an input parameter is being prescribed to treat. A plurality of PID scores may be accessed for each of the related parameters and the alternative parameter may be provided based on a synergy ratio of the alternative parameter compared against the other related parameters.

IV. OVERVIEW

Embodiments of the present disclosure present improved parameter interpretation techniques that leverage synergy predictions to evaluate unique combinations of parameters in a complex prediction domain. Traditional approaches for interpreting and predicting parameter interactions are limited to particular subsets of parameter combinations within a prediction domain due to timing and processing constraints. Unlike traditional approaches, some embodiments of the present disclosure enable the real or near real time determination of predictive insights for unique combinations of parameters that comprehensively span an entire prediction domain. For example, using some of the techniques of the present disclosure, a plurality of PID scores may be determined, and continuously refined, for evaluating a plurality of parameter combinations with respect to a target insight. The PID scores may be accessed in real or near time to evaluate an impact of an input parameter on an entity that may be historical associated with one or more other historical parameters. By doing so, some of the techniques of the present disclosure present parameter interpretation techniques that are tailored to an individual entity as opposed to traditionally generic insights for a population. These insights may be practically applied in any of a number of different prediction domains to proactively address predicted impacts of adding a new parameter, such as a new medication prescription, to an existing set of parameters, such as historically prescribed medications or diagnoses for an individual. In this respect, using some of the techniques of the present disclosure, unique combinations of various parameters, including different medications, dosages, diagnoses, and/or the like, may be evaluated in real time to improve the performance of traditional recommendation engines, such as clinical recommendation systems. When applied in a clinical domain, some of the techniques of the present disclosure allow for the reduction of ADEs that may lead to reduced healthcare costs from treating such events and consequent complications, while increasing patient safety.

Traditionally, parameter interactions are evaluated using guidelines that are created by experts within a prediction domain by reading manufacturer guidelines and matching possible side-effects. Some techniques of the present disclosure may augment (e.g., as a post processing and interpretation step) and/or replace these approaches using information theory to learn parameter interactions, such as synergy ratios, through historical data. Using predictive insights, such as adverse outcome predictions, prediction-based actions may be initiated, such as alerting functionalities, to prevent, acknowledge, and/or proactively address input parameters at risk of causing a target event, such as an ADE. Moreover, unlike traditional techniques, some of the techniques of the present disclosure are extendable for an arbitrary number of parameters, such as prescriptions, conditions, and/or the like, and not limited to pairs of source and target variables. The resulting insights are interpretable, explainable, and comprehensive, and are achievable without complex training datasets, thereby improving computer resource allocation by decreasing processing expenditure.

Examples of technologically advantageous embodiments of the present disclosure include: (i) multi-parameter interpretation techniques for a complex prediction domain, (ii) prediction techniques for generating predictive insights based on multi-parameter interactions, (iii) real time alerting functionalities based on the evaluation of input parameters, among other aspects of the present disclosure. Other technical improvements and advantages may be realized by one of ordinary skill in the art.

V. EXAMPLE SYSTEM OPERATIONS

As indicated, various embodiments of the present disclosure make important technical contributions to parameter interpretation technology. In particular, systems and methods are disclosed herein that implement parameter interpretation techniques for evaluating parameter interactions within complex prediction domains. By doing so, input parameters may be comprehensively evaluated in real or near time to generate predictive insights that are tailored to a particular entity. These insights may enable prediction-based actions to improve the allocation of input parameters within a prediction domain.

Figure 3:
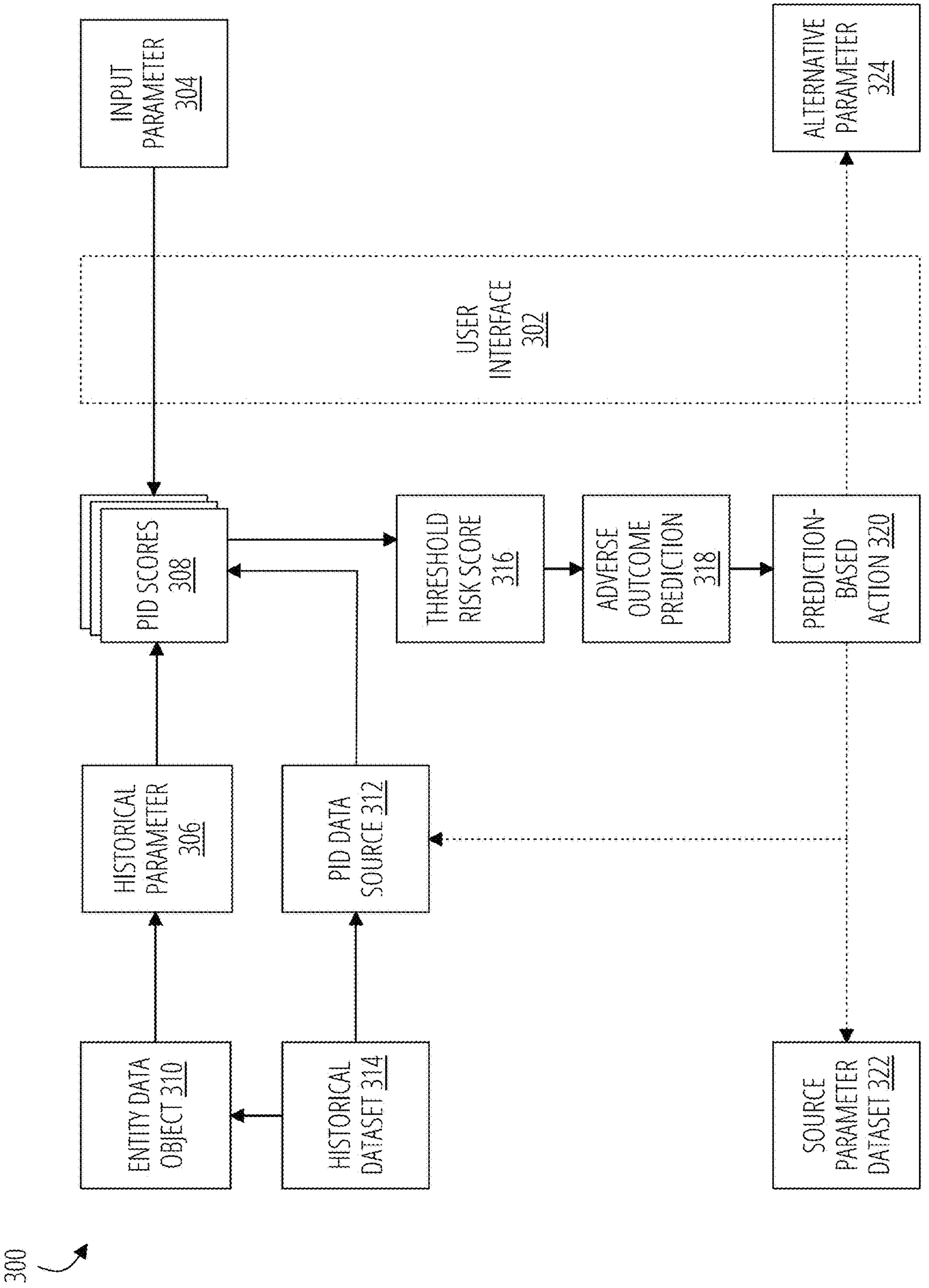
FIG. 3 is a dataflow diagram showing example data structures and modules for generating a predictive insight for an input parameter with respect to an entity in accordance with some embodiments discussed herein.

FIG. 3 is a dataflow diagram 300 showing example data structures and modules for generating a predictive insight for an input parameter with respect to an entity in accordance with some embodiments discussed herein. The dataflow diagram 300, for example, illustrates a user interface 302 that may be configured to receive an input parameter 304 for an entity and initiate one or more prediction-based actions 320 based on the input parameter 304, such as by outputting an alternative parameter 324 for the entity. The input parameter 304 may be processed, using one or more techniques of the present disclosure, to determine an adverse outcome prediction 318 for the entity that is tailored to the input parameter 304 and/or one or more historical parameters 306 for the entity. In this way, real time insights may be generated and provided based on comprehensive and up to date entity information.

In some embodiments, an input parameter 304 is received, for example, through a user interface. For example, the input parameter 304 may correspond to an entity. In some embodiments, the input parameter 304 and one or more historical parameters 306 are received for the entity. In some examples, one or more input parameters 304 may be received. For example, one input parameter 304 or a plurality of input parameters 304 may be received for an entity. In the event of a plurality of input parameters 304, some of the techniques of the present disclosure may be individually performed for each of the input parameters 304. In addition, or alternatively, some of the techniques of the present disclosure may be performed for a combination of plurality of input parameters 304 (and/or historical parameters 306). In some examples, an adverse outcome prediction 318 may be based on the one or more input parameters 304 without consideration of the one or more historical parameters 306.

In some embodiments, the input parameter 304 is a data entity that describes a new, recommended, and/or considered attribute for an entity. The input parameter 304, for example, may include an additional parameter for consideration with respect to an entity. The additional parameter, for example, may be input to the user interface 302 for consideration with respect to an entity data object 310 representing one or more historical parameters 306 for the entity. The input parameter 304 may include any type of parameter depending on the prediction domain, including clinical parameters (e.g., medications, diagnoses, etc.) for a clinical domain, chemical parameters (e.g., chemical sequences, etc.), and/or the like. As an example, in a clinical domain, the input parameter 304 may include a medication prescription for a patient. For instance, a healthcare provider may input one or a plurality of medication prescriptions as one or more input parameters 304 identifying one or more new medications for an entity to the user interface 302. Using some of the techniques of the present disclosure, the user interface 302 (and/or one or more underlying computing systems thereof) may analyze the input parameters 304 and initiate one or more prediction-based actions 320 based on the input parameters 304.

In some embodiments, an entity data object 310 is a data entity that describes an entity within a prediction domain. An entity may be any person, animal, object, and/or the like that is associated with a particular prediction domain. For instance, an entity may depend on the particular prediction domain. As some examples, an entity may include a patient in a clinical domain, a borrower in a financial domain, an animal in a veterinarian domain, and/or the like. As one example, in a clinical domain, an entity may be a patient and/or a member of a healthcare plan.

An entity data object 310 may include a plurality of parameters for an entity. For example, the plurality of parameters may include one or more current and/or historical attributes for an entity. An entity data object 310, for example, may be indicative (e.g., include an entity identifier, etc.) of an entity that is associated with one or more historical parameters 306. By way of example, an entity data object 310 may include a profile for an entity that includes a plurality of contextual attributes and/or interaction attributes for the entity. The contextual attributes, for example, may include one or more demographic attributes, and/or the like. The interaction attributes may include one or more historical interactions for the entity. The historical interactions, for example, may correspond to one or more historical parameters 306 for the entity.

In some embodiments, the historical parameter 306 is a data entity that describes a historical attribute for an entity. The historical parameter 306, for example, may include a parameter that is previously assigned to an entity as reflected by an entity data object 310. The historical parameter 306 may include any type of parameter depending on the prediction domain, including clinical parameters (e.g., medications, diagnoses, etc.) for a clinical domain, chemical parameters (e.g., chemical sequences, etc.) for a financial domain, and/or the like. As an example, in a clinical domain, the historical parameter 306 may include a medication prescription and/or a diagnosis for a patient. For example, the entity data object 310 may include a patient record with a plurality of existing and/or previously prescribed (e.g., within a threshold time range, etc.) medications, conditions, and/or the like for a patient. In some examples, the entity data object 310 may derive, aggregate, and/or the like the historical parameters 306 from a historical dataset 314.

In some embodiments, the historical dataset 314 is a dataset for a prediction domain. For example, the historical dataset 314 may include a comprehensive dataset that aggregates data from one or more disparate data sources associated with a prediction domain. The historical dataset 314 may include a plurality of historical data objects. The historical data objects, for example, may record one or more historical events within the prediction domain. The historical dataset 314 (e.g., the historical data object thereof) may be tailored to a prediction domain. For example, in a clinical domain, the historical dataset 314 may include claims data descriptive of a plurality of medical claims issued by one or more healthcare providers associated with the prediction domain. In some examples, the historical dataset 314 may include a plurality of historical data objects that are issued, recorded, and/or otherwise associated with a time interval.

In some embodiments, a time interval is a unit of time as measured by any of a plurality of different time keeping techniques. In some examples, the time interval may include a frequency for updating the historical dataset 314. For example, a time interval may include a dataset time range (e.g., one or more weeks, months, years, etc.) within which a plurality of historical data objects may be considered for generating one or more predictive insights, such as a plurality of PID scores as described herein, for a prediction domain.

In some embodiments, a historical data object is a data entity of the historical dataset 314. Each historical data object may reference one or more source parameters and/or target parameters corresponding to a historical event within a prediction domain. For example, a historical data object may include a recorded event of a target parameter and/or one or more source parameters for an entity. By way of example, in a clinical domain, historical data object may include a medical claim in which a medication is prescribed and/or a diagnosis is recorded for an entity. In addition, or alternatively, the medical claim may record an occurrence of an ADE for the entity.

In some embodiments, one or more historical parameters 306 are considered in combination with the input parameter 304 to determine one or more risk scores for an entity. In a clinical domain, for example, the one or more risk scores may include a risk of an ADE for a combination between historical parameters 306, such as existing medications and/or conditions/diseases and the input parameter 304, such as a new medication being prescribed. In some examples, the risk scores may be based on PID scores 308 from a PID data source 312.

In some embodiments, a plurality of PID scores 308 are identified, using a PID data source 312, based on the input parameter 304 and/or the one or more historical parameters 306. In some examples, a PID score of the plurality of PID scores 308 is previously generated based on two or more source parameters from a source parameter dataset 322 and a target parameter. The plurality of PID scores 308, for example, may be previously generated using the historical dataset 314 including a plurality of historical data objects for a plurality of entities of the prediction domain. In some examples, each of the historical data objects may be indicative (e.g., include a parameter identifier, etc.) of one or more source parameters from the source parameter dataset 322. By way of example, the source parameter dataset 322 may be indicative (e.g., include one or more medication identifiers, etc.) of (a) a plurality of previously prescribed medications and/or (b) a plurality of previously recorded diagnoses for the plurality of entities. In some examples, the target parameter may be indicative (e.g., include an event identifier, etc.) of an occurrence of an adverse drug event for an entity. Each of the historical data objects may be indicative (e.g., include prediction, event identifiers, etc.) of at least one of a previously recorded medication, diagnosis, and/or occurrence of an ADE.

In some embodiments, the PID data source 312 is a data entity that describes a plurality of precomputed PID scores for a prediction domain. The PID data source 312, for example, may include a data structure for maintaining and/or providing access to a plurality of precomputed PID scores for a prediction domain. For instance, the PID data source 312 may include one or more database(s), for example local database(s), cloud database(s), and/or any combination thereof. In some examples, the PID data source 312 may include a repository of PID scores 308 with one or more access levels. In addition, or alternatively, the PID data source 312 may be configured to distribute one or more portions of the plurality of PID scores 308 based on one or more access levels. The access levels, for example, may specify a subset of PID scores that are associated with one or more characteristics, such a determination time within a time interval, a number of source and/or target parameters, a target parameter definition, and/or the like.

In some embodiments, each of the PID scores 308 is a data entity that describes one or more measures of contribution between a source parameter and a target parameter. For example, a PID score may include a PID value. A PID, for example, may include an extension of a mutual information measure in which a parameter interaction, I(X, Y), between two source parameters, X and Y, describes an amount of information, measured in bits, knowing one source parameter tells you about another source parameter. A PID score describes one or more contribution measurements of multiple source parameters, X and Y, with respect to a target parameter, Z. By way of example, a PID score with source parameters, X and Y, with respect to target parameter, Z, may be represented as: PID I(Z: X, Y). The PID score may be broken down into multiple information components:

$$PID\ I(Z{:}X,Y)=U(Z{:}X\backslash Y)+U(Z{:}Y\backslash X)+R(Z{:}X,Y)+S(Z{:}X,Y)$$

In some embodiments, the multiple source information components of a PID score include one or more source contribution scores, redundancy scores, and/or aggregate contribution scores. For instance, source contribution scores, denoted as U (Z: X\Y) and U (Z: Y\X), may be descriptive of a measure of contribution between a first source parameter and the target parameter in the absence of a known value for a second source parameter. A redundancy score, denoted as R (Z: X, Y), may be descriptive of redundant information shared by the first and second source parameters with respect to the target parameter. An aggregate contribution score, denoted as S (Z: X, Y), is descriptive of synergy information shared by the source parameters with respect to the target parameter.

A PID score may be generated for discrete and/or continuous source parameters. In addition, or alternatively, PID scores may be measured for any number of source parameters (X1, X2, . . . . Xn) and a target parameter Z such that unique and synergistic information may be calculated in a single calculation instead of computing PID scores for each combinatorial pairing of the source parameters.

In some examples, a PID score may include a point wise PID score. A point wise PID score may include a plurality of values (e.g., source contribution scores, redundancy scores, aggregate contribution scores, etc.) for a second source parameter with respect to a target parameter, a fixed first source parameter, and/or one or more values of the second source parameter. By way of example, a plurality of contributions with respect to a binary first parameter, X (e.g., an anti-inflammatory 50 mg capsule in a clinical domain, etc.), a continuous random parameter, Y (e.g., one or more dosages of Steroids in the clinical domain example, etc.), and a binary target parameter, Z (e.g., an adverse drug event, etc. in a clinical domain, etc.) may be modelled as a plurality of point wise PID scores in which one or more source contribution scores, redundancy scores, aggregate contribution scores, and/or the like may be measures for one or more different values (e.g., dosages, etc.) of a continuous parameter.

In some embodiments, the PID data source 312 includes a plurality of precomputed PID scores for a particular prediction domain. The plurality of precomputed PID scores may include a predetermined score for each of a plurality of source parameters and/or target parameters for a prediction domain. While two source parameters are used for exemplary purposes, the PID scores may extend to any number of source parameters including combinations of three, four, ten, and/or the like, source parameters (e.g., medications, diagnoses, etc. in a clinical domain). In some examples, the PID scores, and/or one or more components thereof (e.g., source contribution scores, redundancy scores, aggregate contribution scores, etc.) may be determined offline and retrieved in real time to access a risk of one or more combinations of medications, diagnoses, and/or the like.

By way of example, in a clinical domain, a plurality of precomputed PID scores may be generated for each of a plurality of possible medication-medication and/or medication-diagnosis interactions within the clinical domain. The source parameters, for example, may be defined as whether an entity (e.g., a patient, etc.) has been prescribed medication A (e.g., source parameter X) and/or medication B (e.g., source parameter Y). A target parameter may be defined as whether the entity suffered an adverse outcome (e.g., an ADE, etc.) over some future time period after the point of prescription. In this manner, using some of the techniques of the present disclosure, a plurality of PID scores (and/or components thereof) may be generated for a plurality of medication and diagnosis combinations where source parameters may include a medication that may be prescribed (e.g., an input parameter 304, etc.) and/or an entity's existing medications and/or conditions (e.g., historical parameters 306, etc.) and a target parameter may be whether the entity may suffer an adverse event (e.g., ADE, etc.). This allows for the calculation of source contribution scores, redundancy scores, aggregate contribution scores, and/or the like for a medication being prescribed with an entity's existing set of medications and/or conditions. By precomputing such values, some of the techniques of the present disclosure enable the real time comparison of various information components between the new medications and existing entity medications and/or conditions to flag higher risk prescriptions.

In some embodiments, the source parameter is a data entity that describes a random variable (e.g., X or Y) of a PID score. The source parameter, for example, may include a parameter that is previously identified for a prediction domain. In some examples, the source parameter may have a potential causal impact on a target parameter within the prediction domain. The source parameter may include any type of parameter depending on the prediction domain, including clinical parameters (e.g., medications, diagnoses, etc.) for a clinical domain, chemical parameters (e.g., chemical sequences, etc.), and/or the like. As an example, in a clinical domain, the source parameter may include a medication prescription and/or a diagnosis for a patient. In some examples, a plurality of source parameters for a prediction domain may be identified by the source parameter dataset 322.

In some embodiments, the source parameter dataset 322 is a dataset for a prediction domain. For example, the source parameter dataset 322 may include a comprehensive dataset that aggregates data from one or more disparate data sources associated with a prediction domain. The source parameter dataset 322 may include a plurality of source parameters aggregated from the one or more disparate data sources. The one or more data sources, for example, may be based on the prediction domain and/or source parameters. By way of example, in a clinical domain, the source parameter dataset 322 may include one or more medication codes, such as NDC codes, aggregated from a plurality of medication providers, manufacturers, regulation agencies, and/or the like. As another example, in a clinical domain, the source parameter dataset 322 may include one or more assessment codes, such as ICD codes, aggregated from a plurality of coding agencies, and/or the like. In some examples, the source parameter dataset 322 may aggregate the plurality of source parameters from the historical dataset 314.

In some embodiments, the target parameter is a data entity that describes a target variable (e.g., Z) of a PID score. A target parameter, for example, may include a parameter of interest for a prediction domain. In some examples, a target parameter may be impacted by one or more source parameters, individually and/or in one or more combinations. A target parameter may include any type of parameter of interest for any prediction domain, including clinical parameters of interest (e.g., adverse medical events, etc.) for a clinical domain, chemical parameters of interest (e.g., loan defaults, etc.), and/or the like. As an example, in a clinical domain, a target parameter may include an ADE.

In some embodiments, a target parameter is defined by a target parameter definition. A target parameter definition may define one or more constraints on a target parameter, such as an ADE in a clinical domain. By way of example, a target parameter definition may include one or more timing constraints, severity constraints, and/or the like for defined a particular type of target parameter (e.g., ADE, etc.).

In some examples, one or more target parameter definitions for a target parameter may define a scale for different levels of a target parameter. For instance, the target parameter definitions may define a ranking scale of a level of various adverse outcomes within a prediction domain. By way of example, in a clinical domain, a target parameter definition may include one or more different time periods (e.g., from a prescription of a medication, etc.), one or more different severity levels (e.g., symptoms, conditions, etc.), and/or the like for an ADE to allow clinicians to anticipate and take predictive mitigation actions based on a severity level of a potential ADE. In addition, or alternatively, the target parameter definitions may enable user to prioritize potential risks based their ultimate severity levels.

In some examples, a plurality of PID scores may be generated for each of a plurality of different target parameters as defined by different variations of target parameter definitions. By way of example, a target variable, such as a possible ADE may be treated as a continuous and/or ordinal value. For example, if a hospital and/or healthcare system has an ADE scoring system where an ADE is scored by clinicians on a scale of 1-10, where 0=No ADE, . . . , 10=death from ADE, a different PID score (and/or component thereof) may be generated for each level of the ADE (e.g., one for each numeral from 1 to 10, etc.).

In some embodiments, the PID data source 312 includes a plurality of PID score datasets that respectively correspond to a different target parameter. For instance, a target parameter definition may be received for an entity. In some examples, the PID scores 308 may be identified from the PID data source 312 based on the target parameter definition.

In some embodiments, the plurality of PID scores 308 is precomputed on a time interval based on one or more updates to the plurality of historical data objects for the plurality of entities. For example, the time interval may include a scoring time interval. A scoring time interval, for example, may include a frequency for updating the PID scores 308. For example, a time interval may include a scoring frequency (e.g., one or more weeks, months, years, etc.) for updating one or more PID scores generated based on a historical dataset 314, and/or the like. In addition, or alternatively, a time interval may include a scoring frequency (e.g., one or more weeks, months, years, etc.) at which the plurality of PID scores 308 may be regenerated based on the plurality of historical data objects of the historical dataset 314.

In some embodiments, an adverse outcome prediction 318 is determined based on the plurality of PID scores 308. For example, the adverse outcome prediction 318 may be determined based on a comparison between a plurality of synergy ratios and a threshold risk score 316. By way of example, the plurality of synergy ratios may be determined based on the plurality of PID scores 308, For instance, each of the plurality of synergy ratios may be based on a comparison between an aggregate contribution score and/or one or more of the input parameter contribution scores and/or the one or more historical parameter contribution scores.

In some embodiments, a synergy ratio is a relative measure of impact of an input parameter on a target parameter. For example, a synergy ratio may be based on a comparison between an input contribution score corresponding to the input parameter 304 and an aggregate contribution score. By way of example, a synergy ratio may include a ratio of an aggregate contribution score relative to the input contribution score.

In some embodiments, the adverse outcome prediction 318 is a predictive output that represents target parameter's likelihood of occurrence. The adverse outcome prediction 318, for example, may include a real number, percentage, probability, and/or the like that describes a probability of a target parameter, such as an ADE in a clinical domain. In some examples, the adverse outcome prediction 318 may be based on one or more synergy ratios for an input parameter 304 and/or one or more historical parameters 306 for an entity. In some examples, an adverse outcome prediction 318 may be based on a threshold risk score 316. By way of example, an adverse outcome prediction may identify whether one or more of the synergy ratios achieve and/or exceed the threshold risk score 316.

An adverse outcome prediction 318, for example, may be indicative (e.g., include bit values identifying, etc.) of a likelihood of an occurrence of a target parameter based on synergy ratios corresponding to an input parameter 304 and/or one or more historical parameters 306 for an entity. As described herein, a target parameter may be based on a prediction domain. For example, in a clinical domain, a target parameter may include an occurrence of an ADE that may be defined as an unwanted negative health outcome associated with taking a medication or several medications. A harmful medication-medication interaction may occur when taking medications, A or B, separately is low-risk but taking both medications simultaneously is highly likely to lead to an ADE. Similarly, a medication-diagnosis interaction may occur when taking a medication whilst suffering from a specific diagnosis is highly likely to lead to an ADE. An adverse outcome prediction 318 may be indicative (e.g., include bit values identifying, etc.) of a relative likelihood of an occurrence of an ADE with respect to a combination of medications and/or diagnoses.

In some embodiments, the threshold risk score 316 is a data entity that describes criteria for an adverse outcome prediction 318 derived from one or more PID score-based insights. In some examples, a prediction-based action 320 may be initiated (e.g., by throwing an alert, etc.) based on a comparison of the one or more PID scores 308 for a combination of source parameters, such as an input parameter 304 and/or one or more historical parameters 306 with the threshold risk score 316.

In some embodiments, a performance of a prediction-based action 320 may be initiated in response to the adverse outcome prediction 318. The prediction-based action 320, for example, may include providing an alert to a user that is indicative (e.g., include outcome identifiers, etc.) of the adverse outcome prediction 318.

In some embodiments, the prediction-based action 320 is a computing action initiated, triggered, and/or caused by an adverse outcome prediction 318. By way of example, a prediction-based action 320 may include an initiation of an alert. For instance, an alert may be thrown in the event of a high risk of an occurrence of a target parameter (e.g., ADE, etc.) from the addition of the input parameter 304 (e.g., given a synergy ratio, etc.) for an entity. In a clinical domain, being able to generate alerts if an entity is on multiple medications is important, especially for older demographics where ADEs are common as they are taking on average more medications than the general population.

In some embodiment, an alert is indicative (e.g., include an alternative parameter identifier, etc.) of a particular alternative parameter 324 for the entity. For instance, one or more alternative parameters for the entity may be identified based on the input parameter 304. A plurality of alternative PID scores may be identified, using the PID data source 312, based on each of the alternative parameters and/or the historical parameters 306. An alternative parameter 324 from the one or more alternative parameters 324 may be identified based on the plurality of alternative PID scores.

In some embodiments, the alternative parameter 324 is a data entity that describes a replacement for an input parameter 304. For example, the alternative parameter 324 may include related parameters for replacing the input parameter 304 with an improved (e.g., with respect to safety, efficacy, etc.) alternative based on one or more PID scores respectively corresponding to the input and alternative parameters. By way of example, the prediction-based action 320 may include generating an alternative parameter in response to an adverse outcome prediction 318. To do so, the source parameter dataset 322 may be accessed to identify a plurality of related parameters (e.g., medications for a clinical domain, etc.) for the input parameter 304. The related parameters, for example, may include a plurality of related medications for treating a condition for which an input parameter 304 is being prescribed to treat. A plurality of PID scores 308 may be accessed for each of the related parameters and the alternative parameter may be provided based on a synergy ratio of the alternative parameter compared against the other related parameters.

In this manner, using some of the techniques of the present disclosure, one or more predictive insights, such as adverse outcome predictions 318, alternative parameters 324, and/or the like, may be derived for an input parameter 304 in real time using PID scores 308 corresponding to the input parameter 304 and/or historical parameters 306 of an entity. This allows for the real time detection of adverse interactions between different parameters within a prediction domain. Such interactions, for example, may be determined from PID scores 308 (and/or components thereof) derived for the input parameter 304, the historical parameter 306, and/or the like. An example of PID scores 308 will now further be described with reference to FIGS. 4A-B.

Figure 4A:
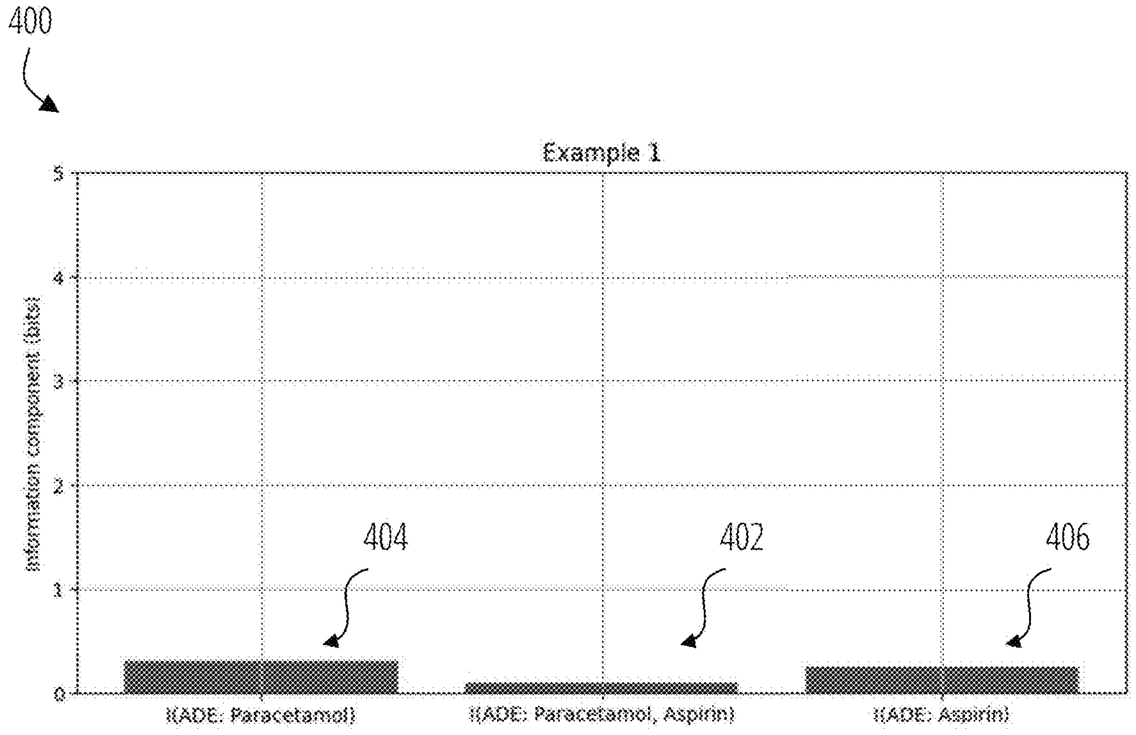
FIGS. 4A-B are exemplary diagrams of one or more example PID scores for an entity in accordance with some embodiments discussed herein.
Figure 4B:
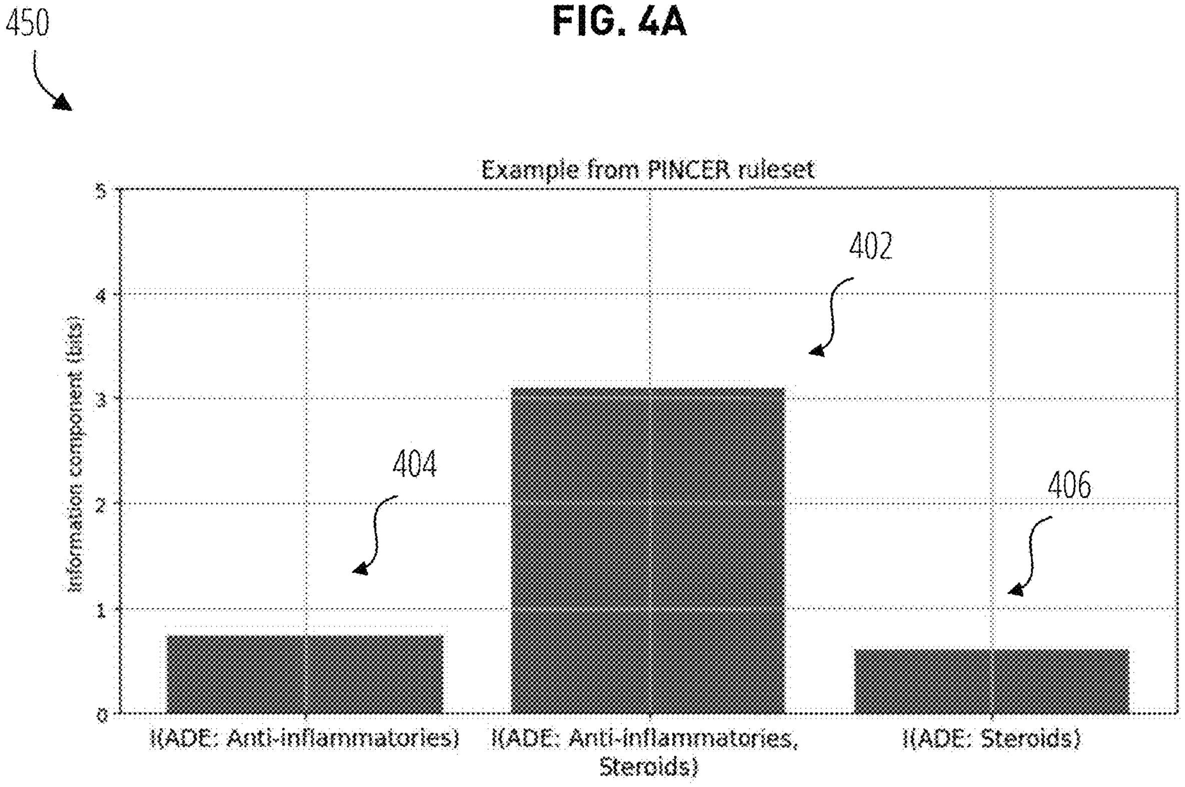

FIGS. 4A-B are exemplary diagrams of one or more example PID scores for an entity in accordance with some embodiments discussed herein. As depicted, the PID scores for an entity may include one or more different types of scores, such as an input parameter contribution score 404, one or more historical parameter contribution scores 406, and/or aggregate contribution scores 402.

For example, the PID scores may include an input parameter contribution score 404 corresponding to an input parameter.

In some embodiments, the input parameter contribution score 404 is a predicted measure of impact that an input parameter may have on a target parameter. For instance, the input parameter contribution score 404 may include a source contribution score that corresponds to an input parameter. The input parameter contribution score 404, for example, may measure the input parameter's individual impact on a target parameter. In a clinical domain, the input parameter contribution score 404 may be indicative (e.g., include one or bit values identifying, etc.) of a potentially prescribed medication's individual impact on a target parameter, such as an ADE for an entity.

In addition, or alternatively, the PID scores may include one or more historical parameter contribution scores 406 corresponding the one or more historical parameters.

In some embodiments, the historical parameter contribution score 406 is a predicted measure of impact that a historical parameter may have on a target parameter. For instance, a historical parameter contribution score 406 may include a source contribution score that corresponds to a historical parameter. The historical parameter contribution score 406, for example, may measure the historical parameter's individual impact on a target parameter. In a clinical domain, the historical parameter contribution score 406 may be indicative (e.g., include one or more bit values identifying, etc.) of a previously prescribed medication and/or diagnosis's individual impact on a target parameter, such as an ADE for an entity.

In some examples, the PID scores may include an aggregate contribution score 402 corresponding to a combination of the input parameter and the one or more historical parameters.

In some embodiments, the aggregate contribution score 402 is a predicted measure of impact that a combination of input and historical parameters may have on a target parameter. For instance, the aggregate contribution score 402 may include an aggregated contribution score that corresponds to a combination of input and historical parameters for an entity. The aggregate contribution score 402, for example, may measure the synergistic impact of a combination of input and historical parameters on a target parameter. In a clinical domain, the aggregate contribution score 402 may be indicative (e.g., include one or more bit values identifying, etc.) of a synergistic impact of a combination of a new mediation with one or more recorded medications and/or diagnoses on a target parameter, such as an ADE for an entity.

In some examples, combinations of source parameters (e.g., input parameters, historical parameters, etc.) that have high synergy information (e.g., aggregate contribution scores 402, etc.) relative to each source parameter's contribution scores (e.g., input parameter contribution score 404, historical parameter contribution score 406, etc.) may be highly likely to be a combination that leads to a target parameter. A synergy ratio may be determined between an aggregate contribution score 402, denoted as I(ADE: A, B), and between two or more source parameters (e.g., input parameter contribution score 404, historical parameter contribution score 406, etc.) and each of the source contributions, denoted I(ADE: A\B) and I(ADE: B\A), respectively.

If one or both synergy ratios are above a threshold risk score, then the combination may be flagged as a potential pairing that is highly likely to lead to a target parameter. In some examples, one or more additional rules may be applied to compare the synergy information (e.g., aggregate contribution score, etc.) with source contributions and/or redundant contribution.

By way of example, with reference to FIG. 4A, the set of source parameters of the example PID score 400 may include source contribution scores (e.g., input parameter contribution score 404 and historical parameter contribution score 406) that exceed, individually, the aggregate contribution score 402. In such a case, the combination of source parameters may be associated with a lower synergy ratio that does not achieve or exceed a threshold risk score.

As another example, with reference to FIG. 4B, the set of source parameters of the example PID score 450 may include source contribution scores (e.g., input parameter contribution score 404 and historical parameter contribution score 406) that are exceeded by the aggregate contribution score 402. In such a case, the combination of source parameters may be associated with a higher synergy ratio that achieves or exceeds a threshold risk score.

In some embodiments, a prediction-based action is initiated in response to the example PID score 450, but not in response to the example PID score 400. In this manner, using some of the techniques of the present disclosure, prediction-based actions may be selectively initiated based on synergy insights from one or more source parameters. The threshold risk score, for example, may include static, dynamic, and/or modifiable value that may be comparable across one or more different PID scores to enable predictive insight based on a direct comparison between PID scores (and/or ratios thereof) with acceptable risk thresholds. An example threshold risk score will now further be described with reference to FIG. 5.

Figure 5:
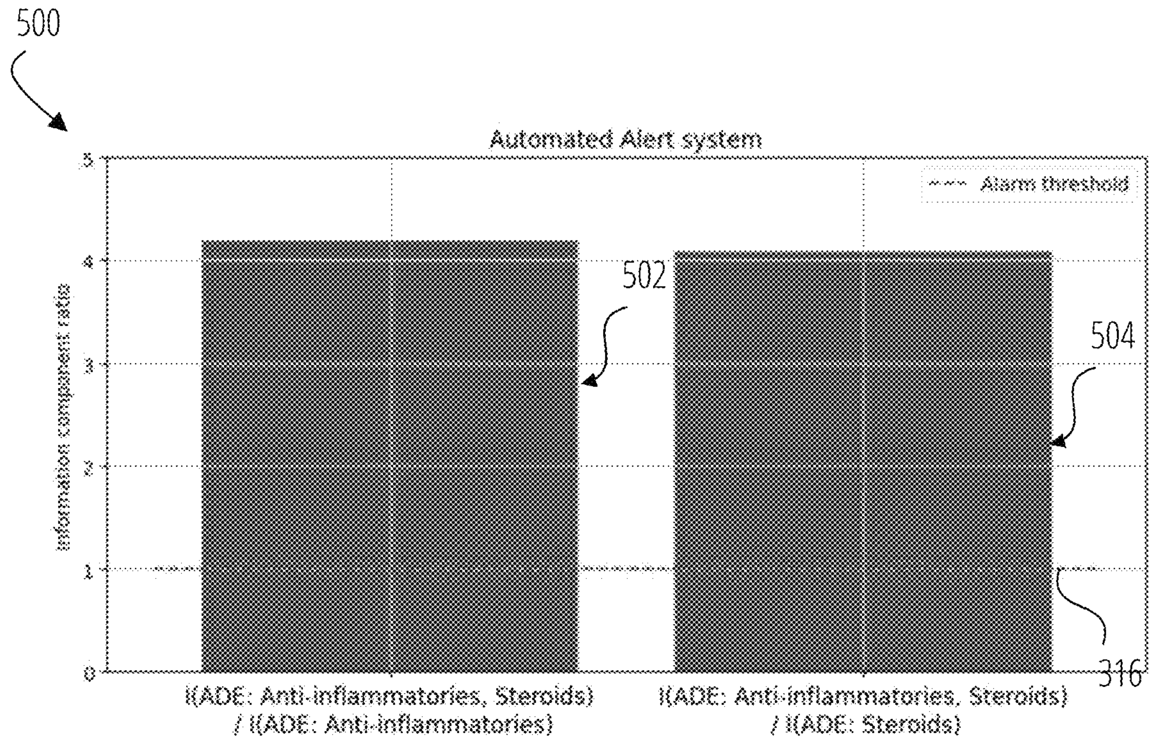
FIG. 5 is an exemplary diagram of a threshold risk score in accordance with some embodiments discussed herein.

FIG. 5 is an exemplary diagram 500 of a threshold risk score in accordance with some embodiments discussed herein. In some examples, the threshold risk score 316 may be based on one or more synergy ratios, such as an input parameter synergy ratio 502 and/or a historical parameter synergy ratio 504. For example, the input parameter synergy ratio 502 may include a synergy ratio of an input parameter relative to one or more other source parameters and a target parameter. The historical parameter synergy ratio 504 may include a synergy ratio of a historical parameter relative to one or more other source parameters and a target parameter.

In some embodiments, the threshold risk score 316 includes a threshold synergy ratio. For instance, the input parameter 304 may be flagged in the event that the input parameter synergy ratio 502 achieves and/or exceeds the threshold risk score 316. In some examples, the input parameter 304 may be flagged in the event that the historical parameter synergy ratio 504 achieves and/or exceeds the threshold risk score 316. In some examples, the prediction-based action 320 may be initiated in response to an input parameter's synergy ratio exceeding the threshold risk score 316.

By way of example, in a clinical domain, anti-inflammatoires and steroids may be well-known drug-drug interactions that increase the probability of an entity suffering an ADE, specifically a gastrointestinal bleed. Using the PID scores 308, such as the input parameter synergy ratio 502 for an anti-inflammatory with respect to a steroid and/or the historical parameter synergy ratio 504 for a steroid with respect to the anti-inflammatory, a determination may be made that the synergy ratios in either case exceed the threshold risk score 316. In such a case, prediction-based action may be initiated to identify an adverse outcome prediction for the combination of anti-inflammatoires with steroids. While both ratios exceed threshold risk score 316 in the presented example, it is noted that a prediction-based action may be initiated in response to a single ratio exceeding the threshold risk score 316.

In some examples, the threshold risk score 316 may include a static value. In addition, or alternatively, the 316 may be dynamically changed based on a plurality PID scores for a prediction domain. An example dynamic threshold risk score will now further be described with reference to FIG. 6.

Figure 6:
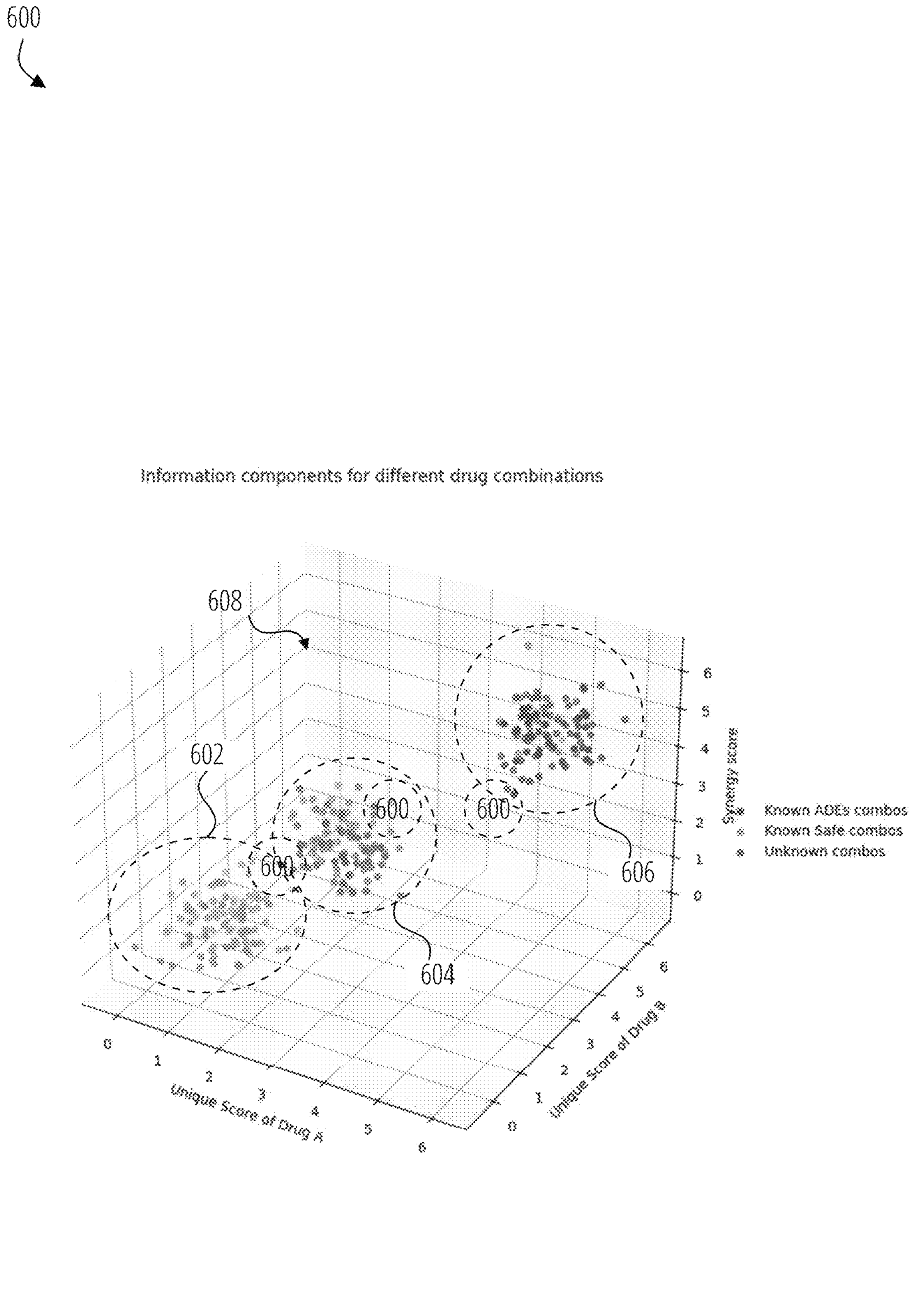
FIG. 6 is an exemplary diagram of a dynamic threshold risk score in accordance with some embodiments discussed herein.

FIG. 6 is an exemplary diagram of a dynamic threshold risk score 600 in accordance with some embodiments discussed herein. As depicted, the dynamic threshold risk score 600 may include one or more values relative to a plurality of historical PID scores 608. For example, the dynamic threshold risk score 600 may include a nearest neighbor and/or any other learned interpolation and/or extrapolation over the plurality of historical PID scores 608. In this manner, the dynamic threshold risk score 600 may be learned over time to identify synergy ratios likely to lead to a target parameter, such as an ADE.

By way of example, the plurality of historical PID scores 608 may include (i) a plurality of safe combinations 602, in which an occurrence of a target parameter (e.g., an ADE, etc.) has not been observed (e.g., from a historical dataset, etc.) in association a combination of source parameters, (ii) a plurality of adverse combinations 606, in which an occurrence of a target parameter (e.g., an ADE, etc.) has been observed (e.g., from a historical dataset, etc.) in association a combination of source parameters, and (iii) a plurality of unknown combinations 604. In some examples, the dynamic threshold risk score 600 may be dynamically set as a highest synergy ratio for the safe combinations 602 and/or unknown combinations 604. In addition, or alternatively, the dynamic threshold risk score 600 may be set as a lowest synergy ratio for the adverse combinations 606.

In some examples, dynamic threshold risk score 600 may be recomputed on a predetermined and/or dynamic frequency (e.g., weekly, monthly, etc.) to adjust one or more changes within the prediction domain over time.

In some examples, one or more alternative parameters may be determined based on the plurality of historical PID scores 608. By way of example, an alternative combination of parameters may be identified based on a distance between each of a plurality of alternative parameters within the safe combinations 602.

Figure 7:
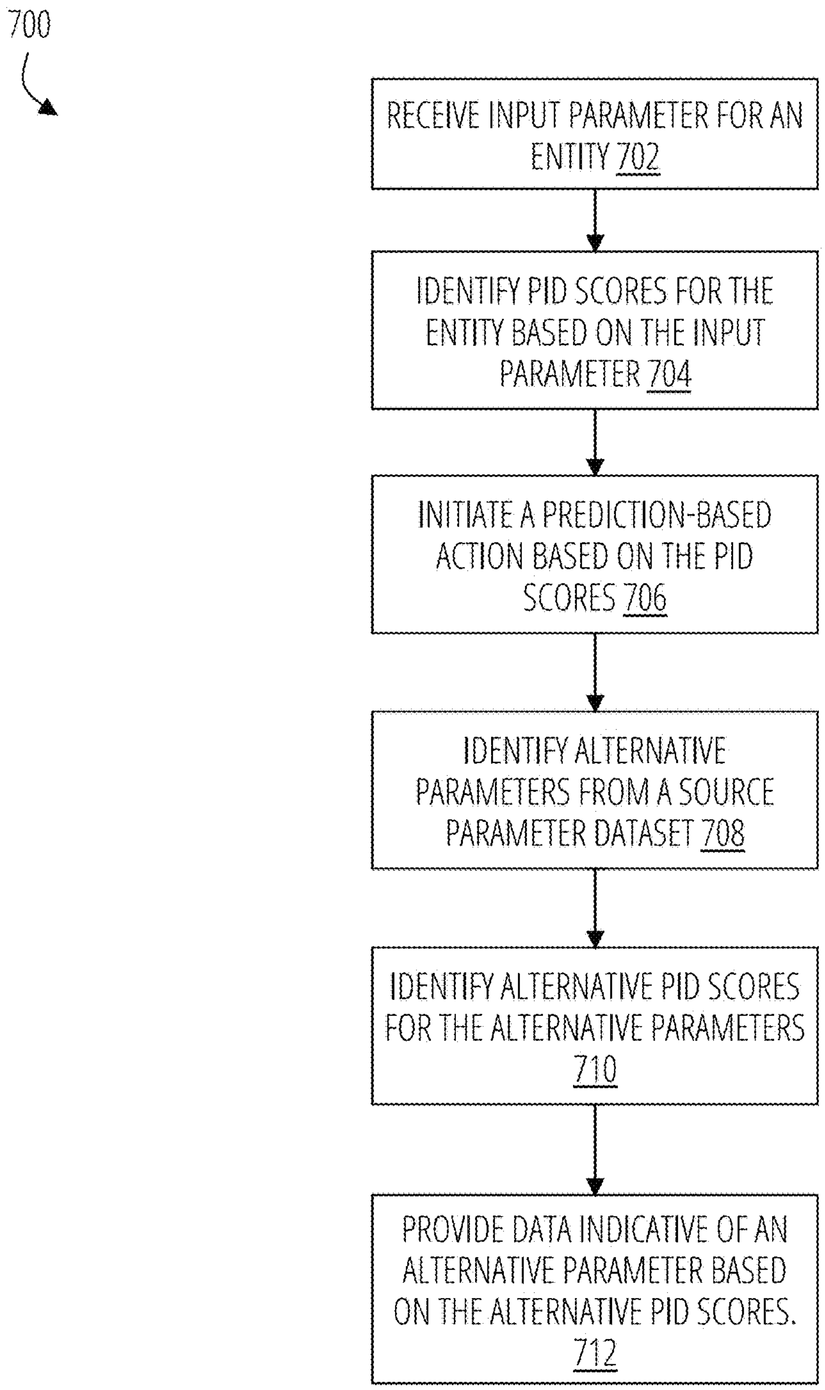
FIG. 7 is a flowchart showing an example of a risk prediction process for processing an input parameter with respect to an entity in accordance with some embodiments discussed herein.

FIG. 7 is a flowchart showing an example of a risk prediction process 700 for processing an input parameter with respect to an entity in accordance with some embodiments discussed herein. The flowchart depicts a risk prediction process 700 for improving the interpretation of parameter interactions in complex prediction domains with respect to traditional parameter insights. The process 700 may be implemented by one or more computing devices, entities, and/or systems described herein. For example, via the various steps/operations of the process 700, the computing system 100 may leverage improved parameter interpretation and modelling techniques to generate predictive, multi-parameter insights that are both comprehensive and uniquely tailored to each of a plurality of parameter combinations within a prediction domain. By doing so, the process 700 enables the real time analysis of any of a plurality of different parameters combination and the initiation of prediction-based actions in response to new parameters for a particular entity. By way of example, unlike traditional parameter insights, the parameter interpretation and modelling techniques may be capable of generating comprehensive insights for each of a plurality of different parameter combinations within a prediction domain that may be updated over time to account of changes within the prediction domain.

FIG. 7 illustrates an example process 700 for explanatory purposes. Although the example process 700 depicts a particular sequence of steps/operations, the sequence may be altered without departing from the scope of the present disclosure. For example, some of the steps/operations depicted may be performed in parallel or in a different sequence that does not materially impact the function of the process 700. In other examples, different components of an example device or system that implements the process 700 may perform functions at substantially the same time or in a specific sequence.

In some embodiments, the process 700 includes, at step/operation 702, receiving an input parameter for an entity. For example, a computing system 100 may receive the input parameter and/or one or more historical parameters for an entity.

By way of example, in a clinical domain, at step/operation 702, a healthcare provider may enter a prescribed medication for a patient and the prescribed medication may be received by the computing system 100 as an input parameter.

In some embodiments, the process 700 includes, at step/operation 704, identifying PID scores for the entity based on the input parameter. For example, the computing system 100 may identify, using a partial information decomposition (PID) data source, a plurality of PID scores based on the input parameter and the one or more historical parameters. By way of example, in a clinical domain, at step/operation 704, the computing system 100 may look up PID scores for newly prescribed medications and/or current prescriptions/conditions for a patient. The plurality of PID scores may include (i) an input parameter contribution score corresponding to the input parameter, (ii) one or more historical parameter contribution scores corresponding the one or more historical parameters, and/or (iii) an aggregate contribution score corresponding to a combination of the input parameter and the one or more historical parameters.

In some embodiments, a PID score of the plurality of PID scores is previously generated based on two or more source parameters from a source parameter dataset and a target parameter. For example, the plurality of PID scores may be previously generated using a historical dataset including a plurality of historical data objects for a plurality of entities. Each of the historical data objects may include one or more source parameters from the source parameter dataset. The source parameter dataset, for example, may be indicative (e.g., include one or more parameter identifiers identifying, etc.) of (a) a plurality of previously prescribed medications and/or (b) a plurality of previously recorded diagnoses for the plurality of entities, and the target parameter may be indicative of (e.g., include one or more ADE identifiers identifying, etc.) an occurrence of an ADE.

In some embodiments, the plurality of PID scores may be precomputed on a time interval based on one or more updates to the plurality of historical data objects for the plurality of entities.

In some embodiments, the PID data source includes a plurality of PID score datasets that respectively correspond to a different target parameter. In some examples, the computing system 100 receives a target parameter definition and identifies the plurality of PID scores based on the target parameter definition.

In some embodiments, the computing system 100 determines an adverse outcome prediction based on the plurality of PID scores. For example, the computing system 100 may determine a plurality of synergy ratios based on the plurality of PID scores. In some examples, each of the plurality of synergy ratios may be based on a comparison between the aggregate contribution score and/or one or more of the input parameter contribution score and/or the one or more historical parameter contribution scores. The computing system 100 may determine the adverse outcome prediction based on a comparison between the plurality of synergy ratios and a threshold risk score. In some examples, the threshold risk score may be based on one or more historical synergy ratios.

In some embodiments, the process 700 includes, at step/operation 706, initiating a prediction-based action based on the PID scores. For example, in response to an adverse outcome prediction, the computing system 100 may initiate the performance of the prediction-based action. In some examples, the prediction-based action may include providing an alert to a user that is indicative (e.g., include one or more outcome identifiers identifying, etc.) of the adverse outcome prediction. By way of example, in a clinical domain, at step/operation 706, the computing system 100 may throw an alert of a high risk of ADE from prescribing a new medication. In some examples, the alert may be indicative (e.g., include alternative parameter identifiers, etc.) of a particular alternative parameter for the entity.

In some embodiments, the process 700 includes, at step/operation 708, identifying alternative parameters from a source parameter dataset. For example, the computing system 100 may identify one or more alternative parameters for the entity based on the input parameter. By way of example, in a clinical domain, at step/operation 708, the computing system 100 may look through a medication database for replacement medications prescribed to treat a condition for the patient.

In some embodiments, the process 700 includes, at step/operation 710, identifying alternative PID scores for the alternative parameters. For example, the computing system 100 may identify, using the PID data source, a plurality of alternative precomputed PID scores based on the one or more alternative parameters and the one or more historical parameters. By way of example, in a clinical domain, at step/operation 710, the computing system 100 may get PID scores for all potential replacement medications. The computing system 100 may identify the particular alternative parameter from the one or more alternative parameters based on the plurality of alternative PID scores.

In some embodiments, the process 700 includes, at step/operation 712, providing data indicative (e.g., includes an alternative parameter identifier, etc.) of an alternative parameter based on the alternative PID scores. By way of example, in a clinical domain, at step/operation 712, the computing system 100 may suggest replacement medications if a synergy ratio is lower for a replacement medication compared to the prescribed medication.

Some techniques of the present disclosure enable the generation of action outputs that may be performed to initiate one or more prediction-based actions to achieve real-world effects. The computer interpretation techniques of the present disclosure may be used, applied, and/or otherwise leveraged to generate parameter insights, such as adverse outcome predictions, which may help in the interpretation and resolution of complex parameter combinations in a complex prediction domain. The parameter insights of the present disclosure may be leveraged to initiate the performance of various computing tasks that improve the performance of a computing system (e.g., a computer itself, etc.) with respect to various prediction-based actions performed by the computing system 100, such as for the identification and handling of parameter combination risks and/or the like. Example prediction-based actions may include the display, transmission, and/or the like of data indicative (e.g., include a prediction identifier, etc.) of adverse outcome predictions, such as alerts of a risky parameter combination, and/or the like. Moreover, one or more prediction-based actions may be derived from such comprehensive data, such as the identification of alternative parameters to reduce risk for which a prediction-based action may be initiated to automatically address.

In some examples, the computing tasks may include prediction-based actions that may be based on a prediction domain. A prediction domain may include any environment in which computing systems may be applied to achieve real-word insights, such as risk predictions (e.g., adverse outcome predictions, etc.), and initiate the performance of computing tasks, such as prediction-based actions to act on the real-world insights (e.g., derived from adverse outcome predictions, etc.). These prediction-based actions may cause real-world changes, for example, by controlling a hardware component, providing alerts, interactive actions, and/or the like.

Examples of prediction domains may include financial systems, clinical systems, autonomous systems, robotic systems, and/or the like. Prediction-based actions in such domains may include the initiation of automated instructions across and between devices, automated notifications, automated scheduling operations, automated precautionary actions, automated security actions, automated data processing actions, and/or the like.

In some embodiments, the parameter interpretation techniques of the process 700 is applied to initiate the performance of one or more prediction-based actions. A prediction-based action may depend on the prediction domain. In some examples, the computing system 100 may leverage the parameter interpretation techniques to initiate an alert, a precautionary measure, and/or the like.

VI. CONCLUSION

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. EXAMPLES

Example 1. A computer-implemented method, the computer-implemented method comprising receiving, by one or more processors, an input parameter and one or more historical parameters for an entity; identifying, by the one or more processors and using a partial information decomposition (PID) data source, a plurality of PID scores based on the input parameter and the one or more historical parameters; determining, by the one or more processors, an adverse outcome prediction based on the plurality of PID scores; and in response to the adverse outcome prediction, initiating, by the one or more processors, the performance of a prediction-based action.

Example 2. The computer-implemented method of example 1, wherein a PID score of the plurality of PID scores is previously generated based on two or more source parameters from a source parameter dataset and a target parameter.

Example 3. The computer-implemented method of example 2, wherein (i) the plurality of PID scores is previously generated using a historical dataset comprising a plurality of historical data objects for a plurality of entities, wherein each of the plurality of historical data objects are indicative of one or more source parameters from the source parameter dataset; and (ii) the plurality of PID scores is precomputed on a time interval based on one or more updates to the plurality of historical data objects for the plurality of entities.

Example 4. The computer-implemented method of any of the preceding examples, wherein the PID data source comprises a plurality of PID score datasets that respectively correspond to a different target parameter and the computer-implemented method further comprises receiving a target parameter definition; and identifying the plurality of PID scores based on the target parameter definition.

Example 5. The computer-implemented method of any of the preceding examples, wherein the plurality of PID scores comprise: (i) an input parameter contribution score corresponding to the input parameter, (ii) one or more historical parameter contribution scores corresponding the one or more historical parameters, and (iii) an aggregate contribution score corresponding to a combination of the input parameter and the one or more historical parameters.

Example 6. The computer-implemented method of example 5, wherein determining the adverse outcome prediction based on the plurality of PID scores comprises determining a plurality of synergy ratios based on the plurality of PID scores, wherein each of the plurality of synergy ratios is based on a comparison between the aggregate contribution score and one or more of the input parameter contribution score or the one or more historical parameter contribution scores; and determining the adverse outcome prediction based on a comparison between the plurality of synergy ratios and a threshold risk score.

Example 7. The computer-implemented method of example 6, wherein the threshold risk score is based on one or more historical synergy ratios.

Example 8. The computer-implemented method of any of the preceding examples, wherein the prediction-based action comprises providing an alert to a user that is indicative of the adverse outcome prediction.

Example 9. The computer-implemented method of example 8, wherein the alert is indicative of a particular alternative parameter for the entity.

Example 10. The computer-implemented method of example 9, further comprising identifying one or more alternative parameters for the entity based on the input parameter; identifying, using the PID data source, a plurality of alternative PID scores based on the one or more alternative parameters and the one or more historical parameters; and identifying the particular alternative parameter from the one or more alternative parameters based on the plurality of alternative PID scores.

Example 11. A computing system comprising memory and one or more processors communicatively coupled to the memory, the one or more processors configured to receive an input parameter and one or more historical parameters for an entity; identify, using a partial information decomposition (PID) data source, a plurality of PID scores based on the input parameter and the one or more historical parameters; determine an adverse outcome prediction based on the plurality of PID scores; and in response to the adverse outcome prediction, initiate the performance of a prediction-based action.

Example 12. The computing system of example 11, wherein a PID score of the plurality of PID scores is previously generated based on two or more source parameters from a source parameter dataset and a target parameter.

Example 13. The computing system of example 12, wherein (i) the plurality of PID scores is previously generated using a historical dataset comprising a plurality of historical data objects for a plurality of entities, wherein each of the plurality of historical data objects are indicative of one or more source parameters from the source parameter dataset; and (ii) the plurality of PID scores is precomputed on a time interval based on one or more updates to the plurality of historical data objects for the plurality of entities.

Example 14. The computing system of any of examples 11 through 13, wherein the PID data source comprises a plurality of PID score datasets that respectively correspond to a different target parameter and the one or more processors are further configured to receive a target parameter definition; and identify the plurality of PID scores based on the target parameter definition.

Example 15. The computing system of any of examples 11 through 14, wherein the plurality of PID scores comprise (i) an input parameter contribution score corresponding to the input parameter, (ii) one or more historical parameter contribution scores corresponding the one or more historical parameters, and (iii) an aggregate contribution score corresponding to a combination of the input parameter and the one or more historical parameters.

Example 16. The computing system of example 15, wherein determining the adverse outcome prediction based on the plurality of PID scores comprises determining a plurality of synergy ratios based on the plurality of PID scores, wherein each of the plurality of synergy ratios is based on a comparison between the aggregate contribution score and one or more of the input parameter contribution score or the one or more historical parameter contribution scores; and determining the adverse outcome prediction based on a comparison between the plurality of synergy ratios and a threshold risk score.

Example 17. One or more non-transitory computer-readable storage media including instructions that, when executed by one or more processors, cause the one or more processors to receive an input parameter and one or more historical parameters for an entity; identify, using a partial information decomposition (PID) data source, a plurality of PID scores based on the input parameter and the one or more historical parameters; determine an adverse outcome prediction based on the plurality of PID scores; and in response to the adverse outcome prediction, initiate the performance of a prediction-based action.

Example 18. The one or more non-transitory computer-readable storage media of example 17, wherein the prediction-based action comprises providing an alert to a user that is indicative of the adverse outcome prediction.

Example 19. The one or more non-transitory computer-readable storage media of example 18, wherein the alert is indicative of a particular alternative parameter for the entity.

Example 20. The one or more non-transitory computer-readable storage media of example 19, wherein the one or more processors are further caused to identify one or more alternative parameters for the entity based on the input parameter; identify, using the PID data source, a plurality of alternative PID scores based on the one or more alternative parameters and the one or more historical parameters; and identify the particular alternative parameter from the one or more alternative parameters based on the plurality of alternative PID scores.

The invention claimed is:

1. A computer-implemented method comprising:

receiving, by one or more processors, an input parameter and one or more historical parameters for an entity;

identifying, by the one or more processors and using a partial information decomposition (PID) data source, a plurality of PID scores based on the input parameter and the one or more historical parameters, wherein a PID score of the plurality of PID scores comprises a contribution score between one or more source parameters from a source parameter dataset and a target parameter;

determining, by the one or more processors, an adverse outcome prediction based on the plurality of PID scores; and in response to the adverse outcome prediction, initiating, by the one or more processors, a performance of a prediction-based action.

2. The computer-implemented method of claim 1, wherein the PID score of the plurality of PID scores is previously generated based on two or more source parameters from the source parameter dataset and the target parameter.

3. The computer-implemented method of claim 2, wherein;

(i) the plurality of PID scores is previously generated using a historical dataset comprising a plurality of historical data objects for a plurality of entities, wherein each of the plurality of historical data objects is indicative of the one or more source parameters from the source parameter dataset; and (ii) the plurality of PID scores is precomputed on a time interval based on one or more updates to the plurality of historical data objects for the plurality of entities.

4. The computer-implemented method of claim 1, wherein the PID data source comprises a plurality of PID score datasets that respectively correspond to a different target parameter and the computer-implemented method further comprises:

receiving a target parameter definition; and identifying the plurality of PID scores based on the target parameter definition.

5. The computer-implemented method of claim 1, wherein the plurality of PID scores comprise:

(i) an input parameter contribution score corresponding to the input parameter, (ii) one or more historical parameter contribution scores corresponding to the one or more historical parameters, and (iii) an aggregate contribution score corresponding to a combination of the input parameter and the one or more historical parameters.

6. The computer-implemented method of claim 5, wherein determining the adverse outcome prediction based on the plurality of PID scores comprises:

determining a plurality of synergy ratios based on the plurality of PID scores, wherein each of the plurality of synergy ratios is based on a comparison between the aggregate contribution score and one or more of the input parameter contribution score or the one or more historical parameter contribution scores; and determining the adverse outcome prediction based on a comparison between the plurality of synergy ratios and a threshold risk score.

7. The computer-implemented method of claim 6, wherein the threshold risk score is based on one or more historical synergy ratios.

8. The computer-implemented method of claim 1, wherein the prediction-based action comprises providing an alert to a user that is indicative of the adverse outcome prediction.

9. The computer-implemented method of claim 8, wherein the alert is indicative of a particular alternative parameter for the entity.

10. The computer-implemented method of claim 9, further comprising:

identifying one or more alternative parameters for the entity based on the input parameter;

identifying, using the PID data source, a plurality of alternative PID scores based on the one or more alternative parameters and the one or more historical parameters; and identifying the particular alternative parameter from the one or more alternative parameters based on the plurality of alternative PID scores.

11. A system comprising:

one or more processors; and one or more memories storing processor-executable instructions that, when executed by the one or more processors, cause the one or more processors to perform operations comprising:

receiving an input parameter and one or more historical parameters for an entity;

identifying, using a partial information decomposition (PID) data source, a plurality of PID scores based on the input parameter and the one or more historical parameters, wherein a PID score of the plurality of PID scores comprises a contribution score between one or more source parameters from a source parameter dataset and a target parameter;

determining an adverse outcome prediction based on the plurality of PID scores; and in response to the adverse outcome prediction, initiating a performance of a prediction-based action.

12. The system of claim 11, wherein the PID score of the plurality of PID scores is previously generated based on two or more source parameters from the source parameter dataset and the target parameter.

13. The system of claim 12, wherein;

(i) the plurality of PID scores is previously generated using a historical dataset comprising a plurality of historical data objects for a plurality of entities, wherein each of the plurality of historical data objects is indicative of the one or more source parameters from the source parameter dataset; and (ii) the plurality of PID scores is precomputed on a time interval based on one or more updates to the plurality of historical data objects for the plurality of entities.

14. The system of claim 11, wherein the PID data source comprises a plurality of PID score datasets that respectively correspond to a different target parameter and the operations further comprise:

receiving a target parameter definition; and identifying the plurality of PID scores based on the target parameter definition.

15. The system of claim 11, wherein the plurality of PID scores comprise:

(i) an input parameter contribution score corresponding to the input parameter, (ii) one or more historical parameter contribution scores corresponding to the one or more historical parameters, and (iii) an aggregate contribution score corresponding to a combination of the input parameter and the one or more historical parameters.

16. The system of claim 15, wherein determining the adverse outcome prediction based on the plurality of PID scores comprises:

determining a plurality of synergy ratios based on the plurality of PID scores, wherein each of the plurality of synergy ratios is based on a comparison between the aggregate contribution score and one or more of the input parameter contribution score or the one or more historical parameter contribution scores; and determining the adverse outcome prediction based on a comparison between the plurality of synergy ratios and a threshold risk score.

17. One or more non-transitory computer-readable media storing processor-executable instructions that, when executed by one or more processors, cause the one or more processors to perform operations comprising:

receiving an input parameter and one or more historical parameters for an entity;

identifying, using a partial information decomposition (PID) data source, a plurality of PID scores based on the input parameter and the one or more historical parameters, wherein a PID score of the plurality of PID scores comprises a contribution score between one or more source parameters from a source parameter dataset and a target parameter;

determining an adverse outcome prediction based on the plurality of PID scores; and in response to the adverse outcome prediction, initiating a performance of a prediction-based action.

18. The one or more non-transitory computer-readable media of claim 17, wherein the prediction-based action comprises providing an alert to a user that is indicative of the adverse outcome prediction.

19. The one or more non-transitory computer-readable media of claim 18, wherein the alert is indicative of a particular alternative parameter for the entity.

20. The one or more non-transitory computer-readable media of claim 19, wherein the operations further comprise:

identifying one or more alternative parameters for the entity based on the input parameter;

identifying, using the PID data source, a plurality of alternative PID scores based on the one or more alternative parameters and the one or more historical parameters; and identifying the particular alternative parameter from the one or more alternative parameters based on the plurality of alternative PID scores.

* * * * *